(12) United States Patent
Boling et al.

(10) Patent No.: US 12,124,576 B2
(45) Date of Patent: Oct. 22, 2024

(54) SYSTEMS AND METHODS FOR POLICY VIOLATION PROCESSING

(71) Applicant: Dover Microsystems, Inc., Wayland, MA (US)

(72) Inventors: Eli Boling, Manchester, MA (US); Steven Milburn, Cranston, RI (US)

(73) Assignee: Dover Microsystems, Inc., Wayland, MA (US)

( * ) Notice: Subject to any disclaimer, the term of this patent is extended or adjusted under 35 U.S.C. 154(b) by 356 days.

(21) Appl. No.: 17/560,975

(22) Filed: Dec. 23, 2021

(65) Prior Publication Data

US 2022/0198014 A1 Jun. 23, 2022

Related U.S. Application Data

(60) Provisional application No. 63/129,965, filed on Dec. 23, 2020.

(51) Int. Cl.
*G06F 21/56* (2013.01)
*G06F 9/38* (2018.01)
*G06F 21/55* (2013.01)

(52) U.S. Cl.
CPC .......... *G06F 21/566* (2013.01); *G06F 9/3861* (2013.01); *G06F 21/552* (2013.01); *G06F 2221/034* (2013.01)

(58) Field of Classification Search
CPC .... G06F 21/566; G06F 21/552; G06F 9/3861; G06F 2221/034
See application file for complete search history.

(56) References Cited

U.S. PATENT DOCUMENTS

| | | |
|---|---|---|
| 5,201,056 A | 4/1993 | Daniel et al. |
| 5,377,336 A | 12/1994 | Eickemeyer et al. |
| 5,488,730 A | 1/1996 | Brown, III et al. |
| 5,521,910 A | 5/1996 | Matthews |
| 5,559,952 A | 9/1996 | Fujimoto |
| 5,655,100 A | 8/1997 | Ebrahim et al. |
| 5,664,197 A | 9/1997 | Kardach et al. |

(Continued)

FOREIGN PATENT DOCUMENTS

| | | |
|---|---|---|
| CN | 101558388 A | 10/2009 |
| CN | 102160033 A | 8/2011 |

(Continued)

OTHER PUBLICATIONS

Protecting the Stack with Metadata Policies and Tagged Hardware by DeHon et al., published 2018. (Year: 2018).*

(Continued)

*Primary Examiner* — Vu V Tran
(74) *Attorney, Agent, or Firm* — Wolf, Greenfield & Sacks, P.C.

(57) ABSTRACT

Systems and methods for violation processing. In some embodiments, in response to detecting a policy violation, tag processing hardware may enter a violation processing mode, and may cause a host processor to begin executing violation processing code. The tag processing hardware may continue checking one or more instructions in an instruction queue. In response to encountering, in the instruction queue, an instruction of the violation processing code, the tag processing hardware may exit the violation processing mode.

29 Claims, 6 Drawing Sheets

(56) References Cited

U.S. PATENT DOCUMENTS

| | | |
|---|---|---|
| 5,664,223 A | 9/1997 | Bender et al. |
| 5,684,977 A | 11/1997 | Van Loo et al. |
| 5,764,946 A | 6/1998 | Tran et al. |
| 5,778,423 A | 7/1998 | Sites et al. |
| 5,848,433 A | 12/1998 | Tran et al. |
| 5,890,008 A | 3/1999 | Panwar et al. |
| 5,941,981 A | 8/1999 | Tran |
| 6,014,734 A | 1/2000 | Tran et al. |
| 6,035,374 A | 3/2000 | Panwar et al. |
| 6,058,466 A | 5/2000 | Panwar et al. |
| 6,240,502 B1 | 5/2001 | Panwar et al. |
| 6,269,436 B1 | 7/2001 | Tran et al. |
| 6,298,432 B1 | 10/2001 | Goto |
| 6,321,297 B1 | 11/2001 | Shamanna et al. |
| 6,324,599 B1 | 11/2001 | Zhou et al. |
| 6,351,784 B1 | 2/2002 | Neal et al. |
| 6,438,673 B1 | 8/2002 | Jourdan et al. |
| 6,449,714 B1 | 9/2002 | Sinharoy |
| 6,549,903 B1 | 4/2003 | Babaian et al. |
| 6,549,959 B1 | 4/2003 | Yates et al. |
| 6,622,182 B1 | 9/2003 | Miller et al. |
| 6,625,146 B1 | 9/2003 | Merchant et al. |
| 6,636,523 B1 | 10/2003 | Lau et al. |
| 6,748,589 B1 | 6/2004 | Johnson et al. |
| 6,922,740 B2 | 7/2005 | Kondratiev et al. |
| 6,976,147 B1 | 12/2005 | Isaac et al. |
| 7,047,394 B1 | 5/2006 | Van Dyke et al. |
| 7,058,918 B2 | 6/2006 | Abramovici et al. |
| 7,095,783 B1 | 8/2006 | Sotheran et al. |
| 7,137,086 B2 | 11/2006 | Abramovici |
| 7,146,548 B1 | 12/2006 | Abramovici |
| 7,213,247 B1 | 5/2007 | Wilner et al. |
| 7,263,572 B2 | 8/2007 | Hiji |
| 7,296,201 B2 | 11/2007 | Abramovici |
| 7,301,541 B2 | 11/2007 | Hansen et al. |
| 7,305,635 B1 | 12/2007 | Abramovici et al. |
| 7,313,820 B2 | 12/2007 | Kilroy |
| 7,340,469 B1 | 3/2008 | Alghathbar et al. |
| 7,348,796 B2 | 3/2008 | Crouch et al. |
| 7,426,705 B1 | 9/2008 | Kolaric |
| 7,430,650 B1 | 9/2008 | Ross |
| 7,434,002 B1 | 10/2008 | Zedlewski et al. |
| 7,467,414 B2 | 12/2008 | Schlesinger |
| 7,487,264 B2 | 2/2009 | Pandya |
| 7,493,247 B2 | 2/2009 | Memmi |
| 7,493,434 B1 | 2/2009 | Abramovici |
| 7,574,536 B2 | 8/2009 | Johnsen et al. |
| 7,580,914 B2 | 8/2009 | Wang et al. |
| 7,581,064 B1 | 8/2009 | Zedlewski et al. |
| 7,631,107 B2 | 12/2009 | Pandya |
| 7,688,838 B1 | 3/2010 | Aloni et al. |
| 7,698,402 B2 | 4/2010 | Santos et al. |
| 7,813,342 B2 | 10/2010 | Gadelrab |
| 7,886,148 B2 | 2/2011 | Kiriansky et al. |
| 8,074,052 B2 | 12/2011 | Iadonato et al. |
| 8,121,828 B2 | 2/2012 | Yates, Jr. et al. |
| 8,127,121 B2 | 2/2012 | Yates, Jr. et al. |
| 8,131,663 B1 | 3/2012 | Taylor |
| 8,131,762 B2 | 3/2012 | Smetters et al. |
| 8,166,404 B2 | 4/2012 | Grinstein |
| 8,181,219 B2 | 5/2012 | Golan et al. |
| 8,271,447 B1 | 9/2012 | Natanzon et al. |
| 8,326,774 B2 | 12/2012 | Candelore |
| 8,335,754 B2 | 12/2012 | Dawson et al. |
| 8,346,760 B2 | 1/2013 | Wang et al. |
| 8,364,910 B2 | 1/2013 | Wilkerson et al. |
| 8,380,933 B2 | 2/2013 | Uchiyama |
| 8,423,720 B2 | 4/2013 | Döring |
| 8,516,193 B1 | 8/2013 | Clinton et al. |
| 8,543,606 B2 | 9/2013 | Pulfer et al. |
| 8,572,410 B1 | 10/2013 | Tkacik et al. |
| 8,677,457 B2 | 3/2014 | Fullerton |
| 8,701,200 B2 | 4/2014 | Naldurg et al. |
| 8,738,860 B1 | 5/2014 | Griffin et al. |
| 8,756,185 B2 | 6/2014 | Dawson et al. |
| 8,788,792 B2 | 7/2014 | Yates, Jr. et al. |
| 8,826,391 B2 | 9/2014 | Tkacik et al. |
| 8,843,734 B2 | 9/2014 | Lim |
| 8,904,477 B2 | 9/2014 | Barton et al. |
| 8,874,850 B1 | 10/2014 | Goodson et al. |
| 8,875,170 B1 | 10/2014 | Daniel |
| 8,887,230 B2 | 11/2014 | Barton et al. |
| 8,938,783 B2 | 1/2015 | Becker et al. |
| 9,026,733 B1 | 5/2015 | Clinton et al. |
| 9,047,178 B2 | 6/2015 | Talagala et al. |
| 9,087,200 B2 | 7/2015 | McKeen et al. |
| 9,165,078 B2 | 10/2015 | Bester et al. |
| 9,208,082 B1 | 12/2015 | Cheriton et al. |
| 9,219,752 B2 | 12/2015 | Balinksy et al. |
| 9,251,052 B2 | 2/2016 | Talagala et al. |
| 9,311,093 B2 | 4/2016 | Gschwind et al. |
| 9,317,708 B2 | 4/2016 | Lee et al. |
| 9,323,684 B2 | 4/2016 | Koker et al. |
| 9,467,474 B2 | 10/2016 | Barton et al. |
| 9,507,589 B2 | 11/2016 | Rao et al. |
| 9,507,598 B1 | 11/2016 | Bonnano et al. |
| 9,513,884 B2 | 12/2016 | Bates et al. |
| 9,525,606 B1 | 12/2016 | Staggs et al. |
| 9,571,509 B1 | 2/2017 | Satish et al. |
| 9,576,147 B1 | 2/2017 | McClintock et al. |
| 9,665,603 B2 | 5/2017 | Bester et al. |
| 9,680,736 B2 | 6/2017 | Kamboh |
| 9,680,738 B2 | 6/2017 | Jackson et al. |
| 9,703,956 B1 | 7/2017 | Watson et al. |
| 9,736,185 B1 | 8/2017 | Belamaric et al. |
| 9,785,440 B2 | 10/2017 | DeHon |
| 9,792,472 B1 | 10/2017 | Robshaw et al. |
| 9,906,557 B2 | 2/2018 | Hsiung et al. |
| 9,953,095 B1 | 4/2018 | Scott et al. |
| 10,073,977 B2 | 9/2018 | Pappachan et al. |
| 10,078,763 B2 | 9/2018 | Chiricescu et al. |
| 10,114,958 B2 | 10/2018 | Sell |
| 10,133,866 B1 | 11/2018 | Kumar et al. |
| 10,152,330 B2 | 12/2018 | Chiricescu et al. |
| 10,235,176 B2 | 3/2019 | DeHon et al. |
| 10,261,794 B2 | 4/2019 | DeHon |
| 10,424,043 B1 | 9/2019 | Koston et al. |
| 10,503,904 B1 | 12/2019 | Singh et al. |
| 10,521,230 B2 | 12/2019 | DeHon |
| 10,545,760 B2 | 1/2020 | DeHon |
| 10,642,616 B2 | 5/2020 | DeHon et al. |
| 10,642,753 B1 | 5/2020 | Steinberg |
| 10,719,630 B2 | 7/2020 | Chiricescu et al. |
| 10,725,778 B2 | 7/2020 | DeHon et al. |
| 10,754,650 B2 | 8/2020 | DeHon et al. |
| 10,936,713 B2 | 3/2021 | DeHon et al. |
| 11,150,910 B2 | 10/2021 | Milburn et al. |
| 11,182,162 B2 | 11/2021 | DeHon et al. |
| 11,188,640 B1 * | 11/2021 | Powell .................. G06F 21/60 |
| 11,263,043 B1 * | 3/2022 | Mukherjee ............ G06F 9/3836 |
| 11,340,902 B2 | 5/2022 | DeHon |
| 11,417,109 B1 | 8/2022 | Theimer et al. |
| 11,507,373 B2 | 11/2022 | Dehon et al. |
| 11,556,664 B2 | 1/2023 | Levy et al. |
| 11,635,960 B2 | 4/2023 | DeHon |
| 2002/0083298 A1 | 6/2002 | Cook et al. |
| 2002/0087795 A1 | 7/2002 | Hum et al. |
| 2002/0124156 A1 | 9/2002 | Yoaz et al. |
| 2003/0014466 A1 | 1/2003 | Berger et al. |
| 2003/0023783 A1 | 1/2003 | Arimilli et al. |
| 2003/0058889 A1 | 3/2003 | Lansing et al. |
| 2003/0120892 A1 | 6/2003 | Hum et al. |
| 2003/0145235 A1 | 7/2003 | Choo |
| 2003/0149895 A1 | 8/2003 | Choo et al. |
| 2003/0172109 A1 | 9/2003 | Dalton et al. |
| 2003/0196108 A1 | 10/2003 | Kung |
| 2004/0015845 A1 | 1/2004 | Hickman |
| 2004/0117599 A1 | 6/2004 | Mittal et al. |
| 2004/0133777 A1 | 7/2004 | Kiriansky et al. |
| 2004/0236876 A1 | 11/2004 | Kondratiev et al. |
| 2004/0255267 A1 | 12/2004 | Meijer |
| 2005/0055565 A1 | 3/2005 | Fournet et al. |
| 2005/0108518 A1 | 5/2005 | Pandya |
| 2005/0149521 A1 | 7/2005 | Wang et al. |

(56) References Cited

U.S. PATENT DOCUMENTS

| | | |
|---|---|---|
| 2005/0149719 A1 | 7/2005 | Kilroy |
| 2005/0154838 A1 | 7/2005 | DeWitt et al. |
| 2005/0182667 A1 | 8/2005 | Metzger et al. |
| 2006/0004548 A1 | 1/2006 | Santos et al. |
| 2006/0059567 A1 | 3/2006 | Bird et al. |
| 2006/0080489 A1 | 4/2006 | Hiji |
| 2006/0080553 A1 | 4/2006 | Hall |
| 2006/0090084 A1 | 4/2006 | Buer |
| 2006/0112261 A1 | 5/2006 | Yourst et al. |
| 2006/0143689 A1 | 6/2006 | Yu et al. |
| 2006/0242332 A1 | 10/2006 | Johnsen et al. |
| 2006/0277392 A1 | 12/2006 | Bittner, Jr. |
| 2007/0006294 A1 | 1/2007 | Hunter |
| 2007/0050586 A1 | 3/2007 | Shin et al. |
| 2007/0226365 A1 | 9/2007 | Hildreth et al. |
| 2007/0239861 A1 | 10/2007 | Reeves et al. |
| 2007/0261033 A1 | 11/2007 | Chen et al. |
| 2007/0279264 A1 | 12/2007 | Nakagawa |
| 2008/0010233 A1 | 1/2008 | Sack et al. |
| 2008/0016547 A1 | 1/2008 | Anderson et al. |
| 2008/0028196 A1 | 1/2008 | Kailas |
| 2008/0052488 A1 | 2/2008 | Fritz et al. |
| 2008/0066160 A1 | 3/2008 | Becker et al. |
| 2008/0083298 A1 | 4/2008 | Lin |
| 2008/0126841 A1 | 5/2008 | Benhanokh et al. |
| 2008/0140737 A1 | 6/2008 | Garst et al. |
| 2008/0168529 A1 | 7/2008 | Anderson et al. |
| 2008/0201333 A1 | 8/2008 | Rowley |
| 2008/0216073 A1 | 9/2008 | Yates et al. |
| 2008/0216102 A1 | 9/2008 | Quinn |
| 2008/0222397 A1 | 9/2008 | Wilkerson et al. |
| 2008/0240111 A1 | 10/2008 | Gadelrab |
| 2008/0244232 A1 | 10/2008 | Sherman et al. |
| 2008/0248599 A1 | 10/2008 | Jaiswal et al. |
| 2008/0250216 A1 | 10/2008 | Kershaw et al. |
| 2008/0282040 A1 | 11/2008 | Doring |
| 2008/0282093 A1 | 11/2008 | Hatakeyama |
| 2008/0288941 A1 | 11/2008 | Adams et al. |
| 2008/0301256 A1 | 12/2008 | McWilliams et al. |
| 2008/0301471 A1 | 12/2008 | Demarest et al. |
| 2008/0320235 A1 | 12/2008 | Beckmann et al. |
| 2009/0006519 A1 | 1/2009 | Nandan et al. |
| 2009/0063951 A1 | 3/2009 | Rjaibi et al. |
| 2009/0097815 A1 | 4/2009 | Lahr et al. |
| 2009/0113110 A1 | 4/2009 | Chen et al. |
| 2009/0113132 A1 | 4/2009 | Cain, III et al. |
| 2009/0113135 A1 | 4/2009 | Cain et al. |
| 2009/0144388 A1 | 6/2009 | Gross et al. |
| 2009/0164705 A1 | 6/2009 | Gorobets |
| 2009/0164766 A1 | 6/2009 | Suggs et al. |
| 2009/0165078 A1 | 6/2009 | Samudrala et al. |
| 2009/0178102 A1 | 7/2009 | Alghathbar et al. |
| 2009/0204785 A1 | 8/2009 | Yates, Jr. et al. |
| 2009/0241097 A1 | 9/2009 | Wang et al. |
| 2009/0254543 A1 | 10/2009 | Ber et al. |
| 2009/0254572 A1 | 10/2009 | Redlich et al. |
| 2010/0011209 A1 | 1/2010 | Kiriansky et al. |
| 2010/0011446 A1 | 1/2010 | Klucher et al. |
| 2010/0022869 A1 | 1/2010 | Kimura |
| 2010/0031360 A1* | 2/2010 | Seshadri ............... G06F 21/74 726/28 |
| 2010/0049974 A1 | 2/2010 | Winjum et al. |
| 2010/0138613 A1 | 6/2010 | Parker |
| 2010/0154026 A1 | 6/2010 | Chatterjee et al. |
| 2010/0169382 A1 | 7/2010 | Sheaffer et al. |
| 2010/0191922 A1 | 7/2010 | Dickey et al. |
| 2010/0228693 A1 | 9/2010 | Dawson et al. |
| 2010/0235580 A1 | 9/2010 | Bouvier |
| 2010/0250729 A1 | 9/2010 | Morris |
| 2010/0332456 A1 | 12/2010 | Prahlad et al. |
| 2010/0332716 A1 | 12/2010 | Sheaffer et al. |
| 2011/0016295 A1 | 1/2011 | Catherwood et al. |
| 2011/0078389 A1 | 3/2011 | Patel et al. |
| 2011/0099336 A1 | 4/2011 | Yasufuku et al. |
| 2011/0126265 A1 | 5/2011 | Fullerton |
| 2011/0161623 A1 | 6/2011 | Eichenberger et al. |
| 2011/0219424 A1 | 9/2011 | Panasyuk et al. |
| 2011/0238805 A1 | 9/2011 | Signori |
| 2012/0036507 A1 | 2/2012 | Jonnala et al. |
| 2012/0079458 A1 | 3/2012 | Williams et al. |
| 2012/0117610 A1 | 5/2012 | Pandya |
| 2012/0144167 A1 | 6/2012 | Yates, Jr. et al. |
| 2012/0151184 A1 | 6/2012 | Wilkerson et al. |
| 2012/0180031 A1 | 7/2012 | Eichenberger et al. |
| 2012/0203970 A1 | 8/2012 | Biran et al. |
| 2012/0210066 A1 | 8/2012 | Joshi et al. |
| 2012/0210068 A1 | 8/2012 | Joshi et al. |
| 2012/0233212 A1 | 9/2012 | Newton et al. |
| 2012/0236756 A1 | 9/2012 | Bennett et al. |
| 2012/0255018 A1 | 10/2012 | Sallam |
| 2012/0297057 A1 | 11/2012 | Ghosh et al. |
| 2013/0006993 A1 | 1/2013 | Kobayashi |
| 2013/0010779 A1 | 1/2013 | Fischer et al. |
| 2013/0016075 A1 | 1/2013 | Kim et al. |
| 2013/0047142 A1 | 2/2013 | Bates et al. |
| 2013/0067593 A1 | 3/2013 | Candelore |
| 2013/0081134 A1 | 3/2013 | Glew et al. |
| 2013/0097369 A1 | 4/2013 | Talagala et al. |
| 2013/0097421 A1 | 4/2013 | Lim |
| 2013/0097667 A1 | 4/2013 | Pulfer et al. |
| 2013/0138892 A1 | 5/2013 | Loh et al. |
| 2013/0159726 A1 | 6/2013 | McKeen et al. |
| 2013/0160075 A1 | 6/2013 | Schlesinger et al. |
| 2013/0160775 A1 | 6/2013 | Curnow |
| 2013/0185475 A1 | 7/2013 | Talagala et al. |
| 2013/0185488 A1 | 7/2013 | Talagala et al. |
| 2013/0212321 A1 | 8/2013 | Talagala et al. |
| 2013/0227218 A1 | 8/2013 | Chang et al. |
| 2013/0254838 A1 | 9/2013 | Ahuja et al. |
| 2013/0275656 A1 | 10/2013 | Talagala et al. |
| 2013/0283017 A1 | 10/2013 | Wilkerson et al. |
| 2013/0290607 A1 | 10/2013 | Chang et al. |
| 2013/0312099 A1 | 11/2013 | Edwards et al. |
| 2013/0326117 A1 | 12/2013 | Aune |
| 2014/0006804 A1 | 1/2014 | Tkacik et al. |
| 2014/0019385 A1 | 1/2014 | Dawson et al. |
| 2014/0047181 A1 | 2/2014 | Peterson et al. |
| 2014/0047183 A1 | 2/2014 | Chawla et al. |
| 2014/0101396 A1 | 4/2014 | Bonanno et al. |
| 2014/0140342 A1 | 5/2014 | Narad |
| 2014/0173211 A1 | 6/2014 | Loh et al. |
| 2014/0223445 A1 | 8/2014 | Beckmann et al. |
| 2014/0280248 A1 | 9/2014 | Bester et al. |
| 2014/0281192 A1 | 9/2014 | Gilda et al. |
| 2014/0282832 A1 | 9/2014 | Chanoch et al. |
| 2014/0283040 A1 | 9/2014 | Wilkerson et al. |
| 2014/0283107 A1 | 9/2014 | Walton et al. |
| 2015/0012689 A1 | 1/2015 | Atkisson et al. |
| 2015/0046658 A1 | 2/2015 | Wilson |
| 2015/0058997 A1 | 2/2015 | Lee et al. |
| 2015/0089186 A1 | 3/2015 | Kim et al. |
| 2015/0092778 A1 | 4/2015 | Jackson et al. |
| 2015/0120699 A1 | 4/2015 | Faerber et al. |
| 2015/0149673 A1 | 5/2015 | Balkan et al. |
| 2015/0205535 A1 | 7/2015 | Joshi et al. |
| 2015/0220453 A1 | 8/2015 | Heisswolf et al. |
| 2015/0249668 A1 | 9/2015 | Reddy et al. |
| 2015/0278311 A1 | 10/2015 | Isherwood et al. |
| 2015/0339062 A1 | 11/2015 | Toyoda et al. |
| 2015/0339329 A1 | 11/2015 | Bester et al. |
| 2015/0378780 A1 | 12/2015 | Busaba et al. |
| 2015/0381660 A1 | 12/2015 | Hsiung et al. |
| 2016/0048551 A1 | 2/2016 | Baldwin et al. |
| 2016/0062803 A1 | 3/2016 | Beckmann et al. |
| 2016/0077816 A1 | 3/2016 | Eilam et al. |
| 2016/0092702 A1 | 3/2016 | Durham et al. |
| 2016/0132536 A1 | 5/2016 | Lee |
| 2016/0140363 A1 | 5/2016 | Chiricescu et al. |
| 2016/0154833 A1 | 6/2016 | Isherwood, Jr. et al. |
| 2016/0170769 A1 | 6/2016 | LeMay |
| 2016/0182408 A1 | 6/2016 | Jani et al. |
| 2016/0188891 A1 | 6/2016 | Schlesinger et al. |
| 2016/0196432 A1 | 7/2016 | Main et al. |
| 2016/0239223 A9 | 8/2016 | Joshi et al. |

(56) References Cited

U.S. PATENT DOCUMENTS

| | | |
|---|---|---|
| 2016/0274810 A1 | 9/2016 | Godard et al. |
| 2016/0335187 A1 | 11/2016 | Greenspan et al. |
| 2016/0350019 A1 | 12/2016 | Koufaty et al. |
| 2016/0350230 A1 | 12/2016 | Murphy |
| 2016/0366102 A1 | 12/2016 | Smith |
| 2016/0371496 A1 | 12/2016 | Sell |
| 2017/0024568 A1 | 1/2017 | Pappachan et al. |
| 2017/0031708 A1 | 2/2017 | Chen et al. |
| 2017/0048249 A1 | 2/2017 | Berrangé |
| 2017/0061160 A1 | 3/2017 | Simonov et al. |
| 2017/0083338 A1 | 3/2017 | Burger et al. |
| 2017/0091107 A1 | 3/2017 | Peterson et al. |
| 2017/0126687 A1 | 5/2017 | Martinelli |
| 2017/0126738 A1 | 5/2017 | Wilkerson et al. |
| 2017/0177367 A1 | 6/2017 | DeHon |
| 2017/0177368 A1 | 6/2017 | DeHon et al. |
| 2017/0192986 A1 | 7/2017 | Isherwood et al. |
| 2017/0220806 A1 | 8/2017 | Munoz et al. |
| 2017/0235840 A1 | 8/2017 | Bester et al. |
| 2017/0286119 A1 | 10/2017 | Al Sheikh et al. |
| 2017/0286151 A1 | 10/2017 | Landers et al. |
| 2017/0293563 A1 | 10/2017 | DeHon et al. |
| 2017/0308480 A1 | 10/2017 | Wilson |
| 2017/0329961 A1 | 11/2017 | Shanbhogue et al. |
| 2018/0011708 A1 | 1/2018 | DeHon |
| 2018/0046579 A1 | 2/2018 | Greenspan et al. |
| 2018/0082055 A1 | 3/2018 | Fleming et al. |
| 2018/0121650 A1 | 5/2018 | Brown |
| 2018/0143890 A1 | 5/2018 | Ogawa et al. |
| 2018/0189062 A1 | 7/2018 | Baghsorkhi et al. |
| 2018/0276085 A1 | 9/2018 | Mitkar et al. |
| 2018/0302443 A1 | 10/2018 | Weiss et al. |
| 2018/0336031 A1 | 11/2018 | DeHon et al. |
| 2018/0336032 A1 | 11/2018 | DeHon et al. |
| 2018/0336033 A1 | 11/2018 | DeHon |
| 2018/0341490 A1 | 11/2018 | DeHon |
| 2019/0034665 A1 | 1/2019 | Chiricescu et al. |
| 2019/0102537 A1* | 4/2019 | Zhang .................. G06F 9/3836 |
| 2019/0141059 A1 | 5/2019 | Shimizu et al. |
| 2019/0155606 A1 | 5/2019 | Rotem et al. |
| 2019/0171457 A1 | 6/2019 | DeHon et al. |
| 2019/0205244 A1 | 7/2019 | Smith |
| 2019/0213322 A1 | 7/2019 | DeHon et al. |
| 2019/0236272 A1 | 8/2019 | Piatt |
| 2019/0243655 A1 | 8/2019 | Milburn et al. |
| 2019/0243768 A1 | 8/2019 | Doshi et al. |
| 2019/0354675 A1 | 11/2019 | Gan et al. |
| 2019/0384604 A1 | 12/2019 | DeHon et al. |
| 2019/0392146 A1 | 12/2019 | Gezalov et al. |
| 2019/0392147 A1 | 12/2019 | Gezalov et al. |
| 2020/0089500 A1 | 3/2020 | DeHon |
| 2020/0125502 A1 | 4/2020 | Durham et al. |
| 2020/0201576 A1 | 6/2020 | Yudanov et al. |
| 2020/0272736 A1* | 8/2020 | DeHon .................. G06F 21/50 |
| 2020/0387374 A1 | 12/2020 | DeHon |
| 2020/0387384 A1 | 12/2020 | Huang |
| 2021/0004231 A1 | 1/2021 | DeHon |
| 2021/0026934 A1 | 1/2021 | Boling et al. |
| 2021/0042100 A1 | 2/2021 | Boling et al. |
| 2021/0055954 A1 | 2/2021 | Milburn et al. |
| 2021/0073375 A1 | 3/2021 | Milburn et al. |
| 2021/0075797 A1 | 3/2021 | Gan et al. |
| 2021/0255890 A1 | 8/2021 | Milburn et al. |
| 2021/0406028 A1 | 12/2021 | Boling et al. |
| 2021/0406137 A1 | 12/2021 | Sutherland et al. |
| 2022/0012329 A1 | 1/2022 | Boling et al. |
| 2022/0043654 A1 | 2/2022 | DeHon et al. |
| 2022/0050904 A1 | 2/2022 | Sullivan et al. |
| 2022/0092173 A1 | 3/2022 | Sutherland et al. |
| 2022/0129343 A1 | 4/2022 | Milburn et al. |
| 2022/0300583 A1 | 9/2022 | Boling et al. |
| 2022/0309134 A1 | 9/2022 | Boling et al. |
| 2022/0374415 A1 | 11/2022 | Boling et al. |
| 2022/0398312 A1 | 12/2022 | Sutherland et al. |
| 2023/0054942 A1 | 2/2023 | Milburn et al. |

FOREIGN PATENT DOCUMENTS

| | | |
|---|---|---|
| CN | 103282889 A | 9/2013 |
| CN | 104657500 A | 5/2015 |
| CN | 104794067 A | 7/2015 |
| GB | 2519608 A | 4/2015 |
| JP | 2013-242633 A | 12/2013 |
| TW | 201333722 A | 8/2013 |
| TW | 201729068 A | 8/2017 |
| TW | 201737675 A | 10/2017 |
| WO | WO 92/03779 A1 | 3/1992 |
| WO | WO 2010/028316 A1 | 3/2010 |
| WO | WO 2015/047295 A1 | 4/2015 |
| WO | WO 2015/183481 A1 | 12/2015 |
| WO | WO 2017/106101 A1 | 6/2017 |
| WO | WO 2017/106103 A2 | 6/2017 |
| WO | WO 2017/221373 A1 | 12/2017 |
| WO | WO 2019/152772 A1 | 8/2019 |
| WO | WO 2019/152792 A1 | 8/2019 |
| WO | WO 2019/152795 A1 | 8/2019 |
| WO | WO 2019/152805 A1 | 8/2019 |
| WO | WO 2019/152822 A1 | 8/2019 |
| WO | WO 2019/213061 A1 | 11/2019 |
| WO | WO 2020/097177 A1 | 5/2020 |
| WO | WO 2020/097179 A1 | 5/2020 |
| WO | WO 2020/102064 A1 | 5/2020 |
| WO | WO 2020/132012 A1 | 6/2020 |
| WO | WO 2020/150351 A1 | 7/2020 |
| WO | WO 2021/076871 A1 | 4/2021 |
| WO | WO 2021/092138 A1 | 5/2021 |

OTHER PUBLICATIONS

Architectural Support for Software-Defined Metadata Processing, by Smith et al., published 2015 (Year: 2015).*
U.S. Appl. No. 16/966,616, filed Jul. 31, 2020, Boling et al.
U.S. Appl. No. 16/966,863, filed Jul. 31, 2020, Milburn et al.
U.S. Appl. No. 17/051,741, filed Oct. 29, 2020, Sutherland et al.
U.S. Appl. No. 16/966,865, filed Jul. 31, 2020, Milburn et al.
U.S. Appl. No. 17/507,398, filed Oct. 21, 2021, Milburn et al.
U.S. Appl. No. 15/168,689, filed May 31, 2016, DeHon et al.
U.S. Appl. No. 15/426,098, filed Feb. 7, 2017, DeHon.
U.S. Appl. No. 15/624,878, filed Jun. 16, 2017, DeHon et al.
U.S. Appl. No. 15/695,541, filed Sep. 5, 2017, DeHon.
U.S. Appl. No. 16/002,642, filed Jun. 7, 2018, DeHon et al.
U.S. Appl. No. 16/002,757, filed Jun. 7, 2018, DeHon et al.
U.S. Appl. No. 16/002,957, filed Jun. 7, 2018, DeHon.
U.S. Appl. No. 16/002,987, filed Jun. 7, 2018, DeHon.
U.S. Appl. No. 16/062,791, filed Jun. 15, 2018, DeHon et al.
U.S. Appl. No. 16/256,640, filed Jan. 24, 2019, DeHon et al.
U.S. Appl. No. 16/684,172, filed Nov. 14, 2019, DeHon.
U.S. Appl. No. 16/905,680, filed Jun. 18, 2020, DeHon.
U.S. Appl. No. 16/929,692, filed Jul. 15, 2020, DeHon.
U.S. Appl. No. 16/062,796, filed Jun. 15, 2018, DeHon et al.
U.S. Appl. No. 16/264,773, filed Feb. 1, 2019, Milburn et al.
U.S. Appl. No. 17/474,830, filed Sep. 14, 2021, Milburn et al.
U.S. Appl. No. 17/292,694, filed May 10, 2021, Boling et al.
U.S. Appl. No. 17/312,675, filed Jun. 10, 2021, Sullivan et al.
U.S. Appl. No. 17/423,701, filed Jul. 16, 2021, Sutherland et al.
U.S. Appl. No. 16/966,866, filed Jul. 31, 2020, Boling et al.
U.S. Appl. No. 17/308,868, filed May 5, 2021, Milburn et al.
U.S. Appl. No. 17/452,271, filed Oct. 26, 2021, DeHon.
U.S. Appl. No. 17/711,092, filed Apr. 1, 2022, Boling et al.
U.S. Appl. No. 17/720,035, filed Apr. 13, 2022, Boling et al.
U.S. Appl. No. 17/769,868, filed Apr. 18, 2022, Boling et al.
U.S. Appl. No. 17/774,799, filed May 5, 2022, Sutherland et al.
International Search Report and Written Opinion for International Application No. PCT/US2019/016242 mailed Mar. 29, 2019.
International Search Report and Written Opinion for International Application No. PCT/US2016/066194 mailed Apr. 7, 2017.
International Search Report and Written Opinion for International Application No. PCT/US2016/066188 mailed Jul. 13, 2017.
Invitation to Pay Additional Fees for International Application No. PCT/US2019/016295 mailed May 3, 2019.

(56) References Cited

OTHER PUBLICATIONS

International Search Report and Written Opinion for International Application No. PCT/US2019/016295 mailed Jun. 26, 2019.
International Preliminary Report on Patentability for International Application No. PCT/US2019/016295 mailed Aug. 13, 2020.
International Search Report and Written Opinion for International Application No. PCT/US2019/016276 mailed Apr. 26, 2019.
International Search Report and Written Opinion for International Application No. PCT/US2019/029880 mailed Aug. 8, 2019.
International Search Report and Written Opinion for International Application No. PCT/US2019/016317 mailed Apr. 16, 2019.
International Search Report and Written Opinion for International Application No. PCT/US2020/059057 mailed Feb. 8, 2021.
International Search Report and Written Opinion for International Application No. PCT/US2019/060030 mailed May 20, 2021.
International Search Report and Written Opinion for International Application No. PCT/US2019/060698 mailed May 20, 2021.
International Search Report and Written Opinion for International Application No. PCT/US2019/067084 mailed Jul. 1, 2021.
International Search Report and Written Opinion for International Application No. PCT/US2019/013678 mailed Jul. 29, 2021.
Invitation to Pay Additional Fees for International Application No. PCT/US2019/013678 mailed Apr. 15, 2020.
International Search Report and Written Opinion for International Application No. PCT/US2021/020602 mailed May 11, 2021.
International Search Report and Written Opinion for International Application No. PCT/US2020/055952 mailed Jan. 28, 2021.
International Preliminary Report on Patentability for International Application No. PCT/US2019/060028 mailed May 20, 2021.
International Search Report and Written Opinion for International Application No. PCT/US2019/060028 mailed Mar. 23, 2020.
International Search Report and Written Opinion for International Application No. PCT/US2019/016272 mailed Apr. 8, 2019.
International Preliminary Report on Patentability for International Application No. PCT/US2019/016272 mailed Aug. 13, 2020.
International Preliminary Report on Patentability for International Application No. PCT/US2019/016276 mailed Aug. 13, 2020.
International Preliminary Report on Patentability for International Application No. PCT/US2019/029880 mailed Nov. 12, 2020.
International Preliminary Report on Patentability for International Application No. PCT/US2019/016317 mailed Aug. 13, 2020.
International Preliminary Report on Patentability for International Application No. PCT/US2020/055952 mailed Aug. 13, 2020.
[No Author Listed], Arm limited: AMBA® AXI™ and ACE™ Protocol Specification. Oct. 28, 2011:1-306. [https://capocaccia.ethz.ch/capo/raw-attachment/wiki/2014/microblaze14/AX14_specification.pdf.].
Alves-Foss et al., Evaluating the Use of Security Tags in Security Policy Enforcement Mechanisms. 2015 48th Hawaii International Conference on System Sciences Jan. 5, 2015:5201-10.
Berlekamp, Algebraic coding theory (revised edition). World Scientific; Mar. 26, 2015. 34 pages.
Calder et al., Process Algebra for Event-Driven Runtime Verification: A Case Study of Wireless Network Management. IFM LNCS 2012;21-23.
Dalton et al., Raksha: a flexible information flow architecture for software security. ACM Proceedings of the 34$^{th}$ Annual International Symposium In Computer Architecture. Jun. 9, 2007;35(2):482-93.
Dalton et al., Real-World Buffer Overflow Protection for Userspace and Kernelspace. USENIX Security Symposium Jul. 28, 2008;395-410.
De Amorim et al., A verified information-flow architecture. Proceedings of the 41st ACM SIGPLAN-SIGACT Symposium on Principles of Programming Languages Jan. 8, 2014:165-78.
De Amorim et al., Micro-policies: Formally verified, tag-based security monitors. 2015 IEEE Symposium on Security and Privacy May 17, 2015:813-30.

Dehon et al., Dover A Metadata-Extended RISC-V. Jan. 6, 2016:34. [https://web.archive.org/web/20160331131339 if /http://riscv.org/wp-content/uploads/2016/01/Wed1430-dover riscv Jan. 2016 v3.pdf].
Dehon et al., Dover: A metadata-extended RISC-V. RISC-V Workshop Oracle Conference Center, Redwood Shores, CA. Jan. 6, 2016. 33 pages.
Dhawan et al., Architectural support for software-defined metadata processing. Proceedings of the Twentieth International Conference on Architectural Support for Programming Languages and Operating Systems (ASPLOS). Mar. 14, 2015:487-502.
Dhawan et al., Area-efficient near-associative memories on FPGAs. ACM Transactions on Reconfigurable Technology and Systems (TRETS). Jan. 23, 2015;7(4):1-22.
Dhawan et al., PUMP: a programmable unit for metadata processing. Proceedings of the Third Workshop on Hardware and Architectural Support for Security and Privacy (HASP). Jun. 15, 2014:1-8.
Engelke et al., Efficient LLVM-Based Dynamic Binary Translation. ACM VEE. Apr. 16, 2021;165-71.
Evans et al., Melding security metadata between software and hardware. Proceedings of the Posters and Demo Track Dec. 3, 2012:1-2.
Geater, Tee requirements for ISA. Thales eSecurity. 2018. 21 pages.
Hritcu, Micro-policies: Formally verified, tag-based security monitors. Proceedings of the 10th ACM Workshop on Programming Languages and Analysis for Security Jul. 4, 2015.
Hunt et al., The Seven Properties of Highly Secure Devices. 2021. 10 pages.
Juglaret et al., Towards a fully abstract compiler using Micro-Policies: Secure compilation for mutually distrustful components. arXiv preprint arXiv:1510.00697. Oct. 2, 2015. 31 pages.
Kane, Runtime Monitoring for Safety-Critical Embedded Systems. Carnegie Mellon University. Feb. 2015;207 pages.
Kannan et al., Decoupling dynamic information flow tracking with a dedicated coprocessor. 2009 IEEE/IFIP International Conference on Dependable Systems & Networks. Jun. 29, 2009:105-14.
Mambretti et al., Trellis: Privilege separation for multi-user applications made easy. International Symposium on Research in Attacks, Intrusions, and Defenses. Springer, Cham. Sep. 1, 2016:437-56.
Nagarakatte et al., SoftBound: Highly Compatible and Complete Spatial Memory Safety for C. University of Pennsylvania Department of Computer and Information Science Technical Report. Jan. 2009. 12 pages.
Okhravi et al., One Giant Leap for Computer Security. IEEE Computer and Reliability Societies. Jul./Aug. 2020;18(4):8-19.
Ozsoy et al., SIFT: A low-overhead dynamic information flow tracking architecture for smt processors. Proceedings of the 8th ACM International Conference on Computing Frontiers. May 3, 2011:1-11.
Roessler et al., Protecting the stack with metadata policies and tagged hardware. 2018 IEEE Symposium on Security and Privacy (SP) May 20, 2018;478-95.
Song et al., Security tagging for a zero-kernel operating system. 2013 46th Hawaii International Conference on System Sciences Jan. 7, 2013:5049-58.
Song et al., The 4th lowRISC Release: Tagged Memory and Minion Core. University of Cambridge. May 2017. 20 pages. https://riscv.org/wp-content/uploads/2017/05/Wed0930riscv201705_ppt.pdf [Last accessed Mar. 31, 2022].
Suh et al., Secure Program Execution via Dynamic Information Flow Tracking. MIT CSAIL. Jul. 2003. 14 pages.
Sullivan et al., The dover inherently secure processor. 2017 IEEE International Symposium on Technologies for Homeland Security (HST) Apr. 25, 2017:1-5.
Tiwari et al., A small cache of large ranges: Hardware methods for efficiently searching, storing, and updating big dataflow tags. 2008 41st IEEE/ACM International Symposium on Microarchitecture Nov. 8, 2008:94-105.
Tiwari et al., Complete information flow tracking from the gates up. InProceedings of the 14th international conference on Architectural support for programming languages and operating systems Mar. 7, 2009;109-20.

(56) References Cited

OTHER PUBLICATIONS

Waterman et al., The RISC-V Instruction Set Manual, vol. I: Unprivileged ISA, Document Version 20191213. RISC-V Foundation. Dec. 2019. 238 pages.
Watson et al., Cheri: A hybrid capability-system architecture for scalable software compartmentalization. 2015 IEEE Symposium on Security and Privacy Sep. 2015;20-37.
Witchel et al., Mondrian Memory Protection. ASPLOS-X. 2002;13 pages.
Woodruff, Cheri: A RISC capability machine for practical memory safety. University of Cambridge, Computer Laboratory; 2014. 112 pages.
Zeldovich et al., Hardware Enforcement of Application Security Policies Using Tagged Memory. USENIX Symposium on Operating Systems Design and Implementation. Dec. 8, 2008:8;225-40.
International Search Report and Written Opinion for International Application No. PCT/US2022/042492 mailed Jan. 11, 2023.
PCT/US2022/042492, Jan. 11, 2023, International Search Report and Written Opinion.
U.S. Appl. No. 17/908,879, filed Sep. 1, 2022, Milburn et al.
U.S. Appl. No. 17/880,539, filed Aug. 3, 2022, Milburn et al.
PCT/US2020/059057, May 19, 2022, International Preliminary Report on Patentability.
PCT/US2019/060030, Mar. 19, 2020, International Search Report and Written Opinion.
PCT/US2019/060698, Feb. 3, 2020, International Search Report and Written Opinion.
PCT/US2019/067084, Mar. 19, 2020, International Search Report and Written Opinion.
PCT/US2019/013678, Jun. 23, 2020, International Search Report and Written Opinion.
PCT/US2021/020602, Sep. 15, 2022, International Preliminary Report on Patentability.
PCT/US2020/055952, Apr. 28, 2022, International Preliminary Report on Patentability.
PCT/US2019/016272, Apr. 8, 2019, International Search Report and Written Opinion.
PCT/US2019/016272, Aug. 13, 2020, International Preliminary Report on Patentability.
PCT/US2019/016276, Apr. 26, 2019, International Search Report and Written Opinion.
PCT/US2019/016276, Aug. 13, 2020, International Preliminary Report on Patentability.
PCT/US2019/029880, Aug. 8, 2019, International Search Report and Written Opinion.
PCT/US2019/029880, Nov. 12, 2020, International Preliminary Report on Patentability.
PCT/US2019/016317, Apr. 16, 2019, International Search Report and Written Opinion.
PCT/US2019/016317, Aug. 13, 2020, International Preliminary Report on Patentability.
PCT/US2020/059057, Feb. 8, 2021, International Search Report and Written Opinion.
PCT/US2016/066188, Jul. 13, 2017, International Search Report and Written Opinion.
PCT/US2016/066194, Apr. 7, 2017, International Search Report and Written Opinion.
PCT/US2019/016242, Mar. 29, 2019, International Search Report and Written Opinion.
PCT/US2019/060030, May 20, 5021, International Search Report and Written Opinion.
PCT/US2019/060698, May 20, 2021, International Search Report and Written Opinion.
PCT/US2019/067084, Jul. 2, 2021, International Search Report and Written Opinion.
PCT/US2019/013678, Apr. 15, 2020, Invitation to Pay Additional Fees.
PCT/US2019/013678, Jul. 29, 2021, International Search Report and Written Opinion.
PCT/US2019/016295, May 3, 2019, Invitation to Pay Additional Fees.
PCT/US2019/016295, Jun. 26, 2019, International Search Report and Written Opinion.
PCT/US2019/016295, Aug. 13, 2020, International Preliminary Report on Patentability.
PCT/US2021/020602, May 11, 2021, International Search Report and Written Opinion.
PCT/US2020/055952, Jan. 28, 2021, International Search Report and Written Opinion.
PCT/US2019/060028, Mar. 23, 2020, International Search Report and Written Opinion.
PCT/US2019/060028, May 20, 2021, International Preliminary Report on Patentability.
International Preliminary Report on Patentability for International Application No. PCT/US2020/059057, mailed May 19, 2022.
International Search Report and Written Opinion for International Application No. PCT/US2019/060030 mailed Mar. 19, 2020.
International Search Report and Written Opinion for International Application No. PCT/US2019/060698 mailed Feb. 3, 2020.
International Search Report and Written Opinion for International Application No. PCT/US2019/067084 mailed Mar. 19, 2020.
International Search Report and Written Opinion for International Application No. PCT/US2019/013678 mailed Jun. 23, 2020.
International Preliminary Report on Patentability for International Application No. PCT/US2021/020602, mailed Sep. 15, 2022.
International Preliminary Report on Patentability for International Application No. PCT/US2020/055952 mailed Apr. 28, 2022.
Mutlu, 18-447 Computer Architecture Lecture 11: Precise Exceptions, State Maintenance, State Recovery. Carnegie Mellon University Lecture. Feb. 11, 2015, 49 pages.

\* cited by examiner

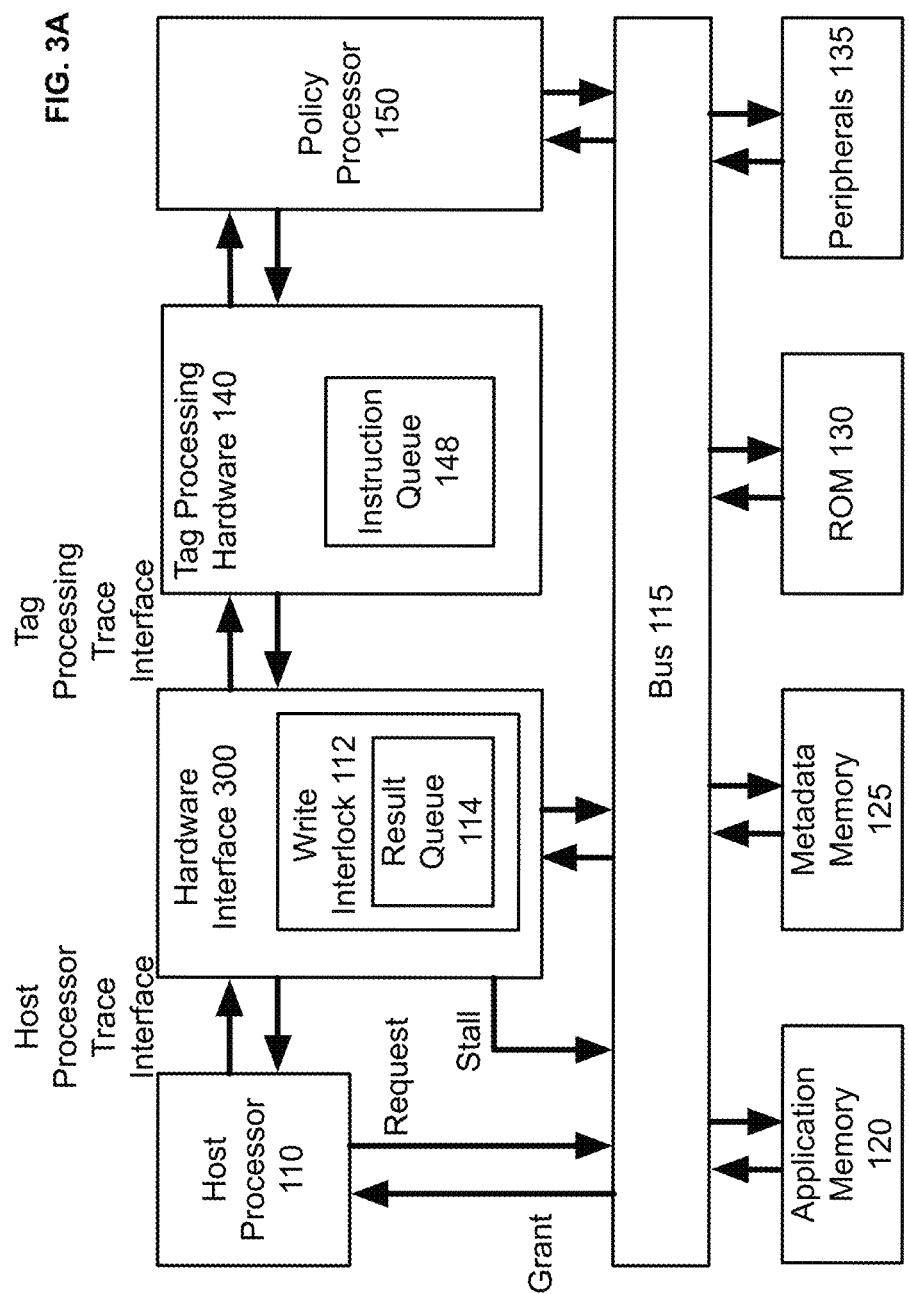

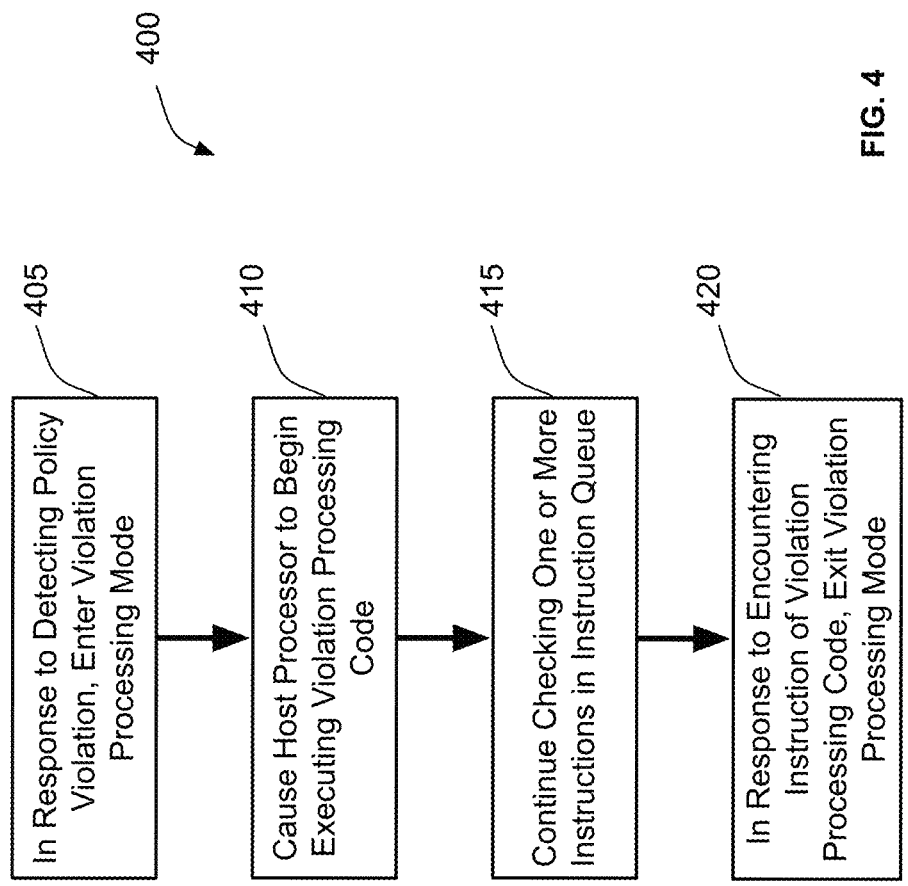

SYSTEMS AND METHODS FOR POLICY VIOLATION PROCESSING

RELATED APPLICATION

This Application is a Non-Provisional of Provisional (35 USC 119(e)) of U.S. Application Ser. No. 63/129,965, filed Dec. 23, 2020, entitled "SYSTEMS AND METHODS FOR POLICY VIOLATION PROCESSING".

BACKGROUND

Computer security has become an increasingly urgent concern at all levels of society, from individuals to businesses to government institutions. For example, in 2015, security researchers identified a zero-day vulnerability that would have allowed an attacker to hack into a Jeep Cherokee's on-board computer system via the Internet and take control of the vehicle's dashboard functions, steering, brakes, and transmission. In 2017, the WannaCry ransomware attack was estimated to have affected more than 200,000 computers worldwide, causing at least hundreds of millions of dollars in economic losses. Notably, the attack crippled operations at several National Health Service hospitals in the UK. In the same year, a data breach at Equifax, a US consumer credit reporting agency, exposed person data such as full names, social security numbers, birth dates, addresses, driver's license numbers, credit card numbers, etc. That attack is reported to have affected over 140 million consumers.

Security professionals are constantly playing catch-up with attackers. As soon as a vulnerability is reported, security professionals rush to patch the vulnerability. Individuals and organizations that fail to patch vulnerabilities in a timely manner (e.g., due to poor governance and/or lack of resources) become easy targets for attackers.

Some security software monitors activities on a computer and/or within a network, and looks for patterns that may be indicative of an attack. Such an approach does not prevent malicious code from being executed in the first place. Often, the damage has been done by the time any suspicious pattern emerges.

SUMMARY

In accordance with some embodiments, a computer-implemented method for policy violation processing is provided, comprising acts of: in response to detecting a policy violation, entering a violation processing mode; causing a host processor to begin executing violation processing code; continuing checking one or more instructions in an instruction queue; and in response to encountering, in the instruction queue, an instruction of the violation processing code, exiting the violation processing mode.

In accordance with some embodiments, a system is provided, comprising circuitry and/or one or more processors programmed by executable instructions, wherein the circuitry and/or the one or more programmed processors are configured to perform any of the methods described herein.

In accordance with some embodiments, at least one computer-readable medium is provided, having stored thereon at least one netlist for any of the circuitries described herein.

In accordance with some embodiments, at least one computer-readable medium is provided, having stored thereon at least one hardware description that, when synthesized, produces any of the netlists described herein.

In accordance with some embodiments, at least one computer-readable medium is provided, having stored thereon any of the executable instructions described herein.

BRIEF DESCRIPTION OF DRAWINGS

FIG. 3A shows an illustrative hardware interface 300, in accordance with some embodiments.

FIG. 4 shows an illustrative process 400 for violation processing, in accordance with some embodiments.

DETAILED DESCRIPTION

Many vulnerabilities exploited by attackers trace back to a computer architectural design where data and executable instructions are intermingled in a same memory. This intermingling allows an attacker to inject malicious code into a remote computer by disguising the malicious code as data. For instance, a program may allocate a buffer in a computer's memory to store data received via a network. If the program receives more data than the buffer can hold, but does not check the size of the received data prior to writing the data into the buffer, part of the received data would be written beyond the buffer's boundary, into adjacent memory. An attacker may exploit this behavior to inject malicious code into the adjacent memory. If the adjacent memory is allocated for executable code, the malicious code may eventually be executed by the computer.

Techniques have been proposed to make computer hardware more security aware. For instance, memory locations may be associated with metadata for use in enforcing security policies, and instructions may be checked for compliance with the security policies. For example, given an instruction to be executed, metadata associated with the instruction and/or metadata associated with one or more operands of the instruction may be checked to determine if the instruction should be allowed. Additionally, or alternatively, appropriate metadata may be associated with an output of the instruction.

It should be appreciated that security policies are described herein solely for purposes of illustration, as aspects of the present disclosure are not limited to enforcing any particular type of policy, or any policy at all. In some embodiments, one or more of the techniques described herein may be used to enforce one or more other types of policies (e.g., safety policies, privacy policies, etc.), in addition to, or instead of, security policies.

Figure 1:
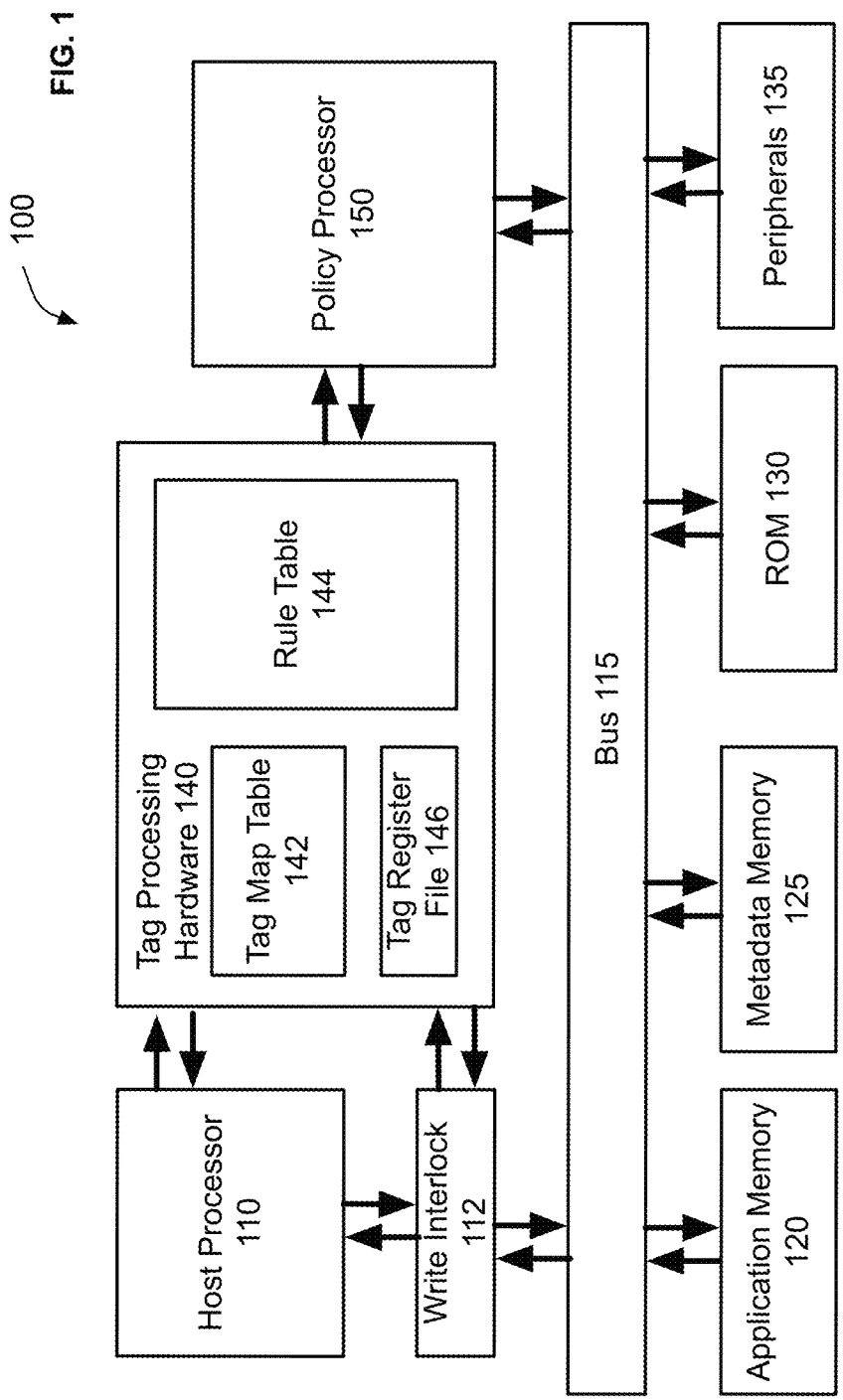
FIG. 1 shows an illustrative hardware system 100 for enforcing policies, in accordance with some embodiments.

FIG. 1 shows an illustrative hardware system 100 for enforcing policies, in accordance with some embodiments. In this example, the system 100 includes a host processor 110, which may have any suitable instruction set architecture (ISA) such as a reduced instruction set computing (RISC) architecture or a complex instruction set computing (CISC) architecture. The host processor 110 may perform memory accesses via a write interlock 112. The write interlock 112 may be connected to a system bus 115 configured to transfer data between various components such as the write interlock 112, an application memory 120, a metadata memory 125, a read-only memory (ROM) 130, one or more peripherals 135, etc.

In some embodiments, data that is manipulated (e.g., modified, consumed, and/or produced) by the host processor 110 may be stored in the application memory 120. Such data may be referred to herein as "application data," as distinguished from metadata used for enforcing policies. The latter may be stored in the metadata memory 125. It should be appreciated that application data may include data manipulated by an operating system (OS), instructions of the OS, data manipulated by one or more user applications, and/or instructions of the one or more user applications.

In some embodiments, the application memory 120 and the metadata memory 125 may be physically separate, and the host processor 110 may have no access to the metadata memory 125. In this manner, even if an attacker succeeds in injecting malicious code into the application memory 120 and causing the host processor 110 to execute the malicious code, the metadata memory 125 may not be affected. However, it should be appreciated that aspects of the present disclosure are not limited to storing application data and metadata on physically separate memories. Additionally, or alternatively, metadata may be stored in a same memory as application data, and a memory management component may be used that implements an appropriate protection scheme to prevent instructions executing on the host processor 110 from modifying the metadata. Additionally, or alternatively, metadata may be intermingled with application data in a same memory, and one or more policies may be used to protect the metadata.

In some embodiments, tag processing hardware 140 may be provided to ensure that instructions being executed by the host processor 110 comply with one or more policies. The tag processing hardware 140 may include any suitable circuit component or combination of circuit components. For instance, the tag processing hardware 140 may include a tag map table 142 that maps addresses in the application memory 120 to addresses in the metadata memory 125. For example, the tag map table 142 may map an address X in the application memory 120 to an address Y in the metadata memory 125. A value stored at the address Y is sometimes referred to herein as a "metadata tag."

In some embodiments, a value stored at the address Y may in turn be an address Z. Such indirection may be repeated any suitable number of times, and may eventually lead to a data structure in the metadata memory 125 for storing metadata. Such metadata, as well as any intermediate address (e.g., the address Z), are also referred to herein as "metadata tags."

It should be appreciated that aspects of the present disclosure are not limited to a tag map table that stores addresses in a metadata memory. In some embodiments, a tag map table entry itself may store metadata, so that the tag processing hardware 140 may be able to access the metadata without performing a memory operation. In some embodiments, a tag map table entry may store a selected bit pattern, where a first portion of the bit pattern may encode metadata, and a second portion of the bit pattern may encode an address in a metadata memory where further metadata may be stored. This may provide a desired balance between speed and expressivity. For instance, the tag processing hardware 140 may be able to check certain policies quickly, using only the metadata stored in the tag map table entry itself. For other policies with more complex rules, the tag processing hardware 140 may access the further metadata stored in the metadata memory 125.

Referring again to FIG. 1, by mapping application memory addresses to metadata memory addresses, the tag map table 142 may create an association between application data and metadata that describes the application data. In one example, metadata stored at the metadata memory address Y and thus associated with application data stored at the application memory address X may indicate that the application data may be readable, writable, and/or executable. In another example, metadata stored at the metadata memory address Y and thus associated with application data stored at the application memory address X may indicate a type of the application data (e.g., integer, pointer, 16-bit word, 32-bit word, etc.). Depending on a policy to be enforced, any suitable metadata relevant for the policy may be associated with a piece of application data.

In some embodiments, a metadata memory address Z may be stored at the metadata memory address Y. Metadata to be associated with the application data stored at the application memory address X may be stored at the metadata memory address Z, instead of (or in addition to) the metadata memory address Y. For instance, a binary representation of a metadata label RED may be stored at the metadata memory address Z. By storing the metadata memory address Z in the metadata memory address Y, the application data stored at the application memory address X may be tagged RED.

In this manner, the binary representation of the metadata label RED may be stored only once in the metadata memory 125. For instance, if application data stored at another application memory address X' is also to be tagged RED, the tag map table 142 may map the application memory address X' to a metadata memory address Y' where the metadata memory address Z is also stored.

Moreover, in this manner, tag update may be simplified. For instance, if the application data stored at the application memory address X is to be tagged BLUE at a subsequent time, a metadata memory address Z' may be written at the metadata memory address Y, to replace the metadata memory address Z, and a binary representation of the metadata label BLUE may be stored at the metadata memory address Z'.

Thus, the inventors have recognized and appreciated that a chain of metadata memory addresses of any suitable length N may be used for tagging, including N=0 (e.g., where a binary representation of a metadata label is stored at the metadata memory address Y itself).

The association between application data and metadata (also referred to herein as "tagging") may be done at any suitable level of granularity, and/or variable granularity. For instance, tagging may be done on a word-by-word basis. Additionally, or alternatively, a region in memory may be mapped to a single metadata tag, so that all words in that region are associated with the same metadata. This may advantageously reduce a size of the tag map table 142 and/or the metadata memory 125. For example, a single metadata tag may be maintained for an entire address range, as opposed to maintaining multiple metadata tags corresponding, respectively, to different addresses in the address range.

In some embodiments, the tag processing hardware 140 may be configured to apply one or more rules to metadata associated with an instruction and/or metadata associated with one or more operands of the instruction to determine if the instruction should be allowed. For instance, the host processor 110 may fetch and execute an instruction (e.g., a store instruction), and may queue a result of executing the instruction (e.g., a value to be stored) into the write interlock 112. Before the result is written back into the application memory 120, the host processor 110 may send, to the tag processing hardware 140, an instruction type (e.g., opcode), an address where the instruction is stored, one or more memory addresses referenced by the instruction, and/or one or more register identifiers. Such a register identifier may identify a register used by the host processor 110 in executing the instruction, such as a register for storing an operand or a result of the instruction.

In some embodiments, destructive load instructions may be queued in addition to, or instead of, store instructions. For instance, subsequent instructions attempting to access a target address of a destructive load instruction may be queued in a memory region that is not cached. If and when it is determined that the destructive load instruction should be allowed, the queued instructions may be loaded for execution.

In some embodiments, a destructive load instruction may be allowed to proceed, and data read from a target address may be captured in a buffer. If and when it is determined that the destructive load instruction should be allowed, the data captured in the buffer may be discarded. If and when it is determined that the destructive load instruction should not be allowed, the data captured in the buffer may be restored to the target address. Additionally, or alternatively, a subsequent read may be serviced by the buffered data.

It should be appreciated that aspects of the present disclosure are not limited to performing metadata processing on instructions that have been executed by a host processor, such as instructions that have been retired by the host processor's execution pipeline. In some embodiments, metadata processing may be performed on instructions before, during, and/or after the host processor's execution pipeline.

In some embodiments, given an address received from the host processor 110 (e.g., an address where an instruction is stored, or an address referenced by an instruction), the tag processing hardware 140 may use the tag map table 142 to identify a corresponding metadata tag. Additionally, or alternatively, for a register identifier received from the host processor 110, the tag processing hardware 140 may access a metadata tag from a tag register file 146 within the tag processing hardware 140.

In some embodiments, if an application memory address does not have a corresponding entry in the tag map table 142, the tag processing hardware 140 may send a query to a policy processor 150. The query may include the application memory address, and the policy processor 150 may return a metadata tag for that application memory address. Additionally, or alternatively, the policy processor 150 may create a new tag map entry for an address range including the application memory address. In this manner, the appropriate metadata tag may be made available, for future reference, in the tag map table 142 in association with the application memory address.

In some embodiments, the tag processing hardware 140 may send a query to the policy processor 150 to check if an instruction executed by the host processor 110 should be allowed. The query may include one or more inputs, such as an instruction type (e.g., opcode) of the instruction, a metadata tag for a program counter, a metadata tag for an application memory address from which the instruction is fetched (e.g., a word in memory to which the program counter points), a metadata tag for a register in which an operand of the instruction is stored, and/or a metadata tag for an application memory address referenced by the instruction. In one example, the instruction may be a load instruction, and an operand of the instruction may be an application memory address from which application data is to be loaded. The query may include, among other things, a metadata tag for a register in which the application memory address is stored, as well as a metadata tag for the application memory address itself. In another example, the instruction may be an arithmetic instruction, and there may be two operands. The query may include, among other things, a first metadata tag for a first register in which a first operand is stored, and a second metadata tag for a second register in which a second operand is stored.

It should also be appreciated that aspects of the present disclosure are not limited to performing metadata processing on a single instruction at a time. In some embodiments, multiple instructions in a host processor's ISA may be checked together as a bundle, for example, via a single query to the policy processor 150. Such a query may include more inputs to allow the policy processor 150 to check all of the instructions in the bundle. Similarly, a CISC instruction, which may correspond semantically to multiple operations, may be checked via a single query to the policy processor 150, where the query may include sufficient inputs to allow the policy processor 150 to check all of the constituent operations within the CISC instruction.

In some embodiments, the policy processor 150 may include a configurable processing unit, such as a microprocessor, a field-programmable gate array (FPGA), and/or any other suitable circuitry. The policy processor 150 may have loaded therein one or more policies that describe allowed operations of the host processor 110. In response to a query from the tag processing hardware 140, the policy processor 150 may evaluate one or more of the policies to determine if an instruction should be allowed. For instance, the tag processing hardware 140 may send an interrupt signal to the policy processor 150, along with one or more inputs relating to the instruction (e.g., as described above). The policy processor 150 may store the inputs of the query in a working memory (e.g., in one or more queues) for immediate or deferred processing. For example, the policy processor 150 may prioritize processing of queries in some suitable manner (e.g., based on a priority flag associated with each query).

In some embodiments, the policy processor 150 may evaluate one or more policies on one or more inputs (e.g., one or more input metadata tags) to determine if an instruction should be allowed. If the instruction is not to be allowed, the policy processor 150 may so notify the tag processing hardware 140. If the instruction is to be allowed, the policy processor 150 may compute one or more outputs (e.g., one or more output metadata tags) to be returned to the tag processing hardware 140. As one example, the instruction may be a store instruction, and the policy processor 150 may compute an output metadata tag for an application memory address to which application data is to be stored. As another example, the instruction may be an arithmetic instruction, and the policy processor 150 may compute an output metadata tag for a register for storing a result of executing the arithmetic instruction.

In some embodiments, the policy processor 150 may be programmed to perform one or more tasks in addition to, or instead of, those relating to evaluation of policies. For instance, the policy processor 150 may perform tasks relating to tag initialization, boot loading, application loading, memory management (e.g., garbage collection) for the metadata memory 125, logging, debugging support, and/or interrupt processing. One or more of these tasks may be performed in the background (e.g., between servicing queries from the tag processing hardware 140).

In some embodiments, the tag processing hardware 140 may include a rule table 144 for mapping one or more inputs to a decision and/or one or more outputs. For instance, a query into the rule table 144 may be similarly constructed as a query to the policy processor 150 to check if an instruction executed by the host processor 110 should be allowed. If there is a match, the rule table 144 may output a decision as to whether to the instruction should be allowed, and/or one or more output metadata tags (e.g., as described above in connection with the policy processor 150). Such a mapping in the rule table 144 may be created using a query response from the policy processor 150. However, that is not required, as in some embodiments, one or more mappings may be installed into the rule table 144 ahead of time.

In some embodiments, the rule table 144 may be used to provide a performance enhancement. For instance, before querying the policy processor 150 with one or more input metadata tags, the tag processing hardware 140 may first query the rule table 144 with the one or more input metadata tags. In case of a match, the tag processing hardware 140 may proceed with a decision and/or one or more output metadata tags from the rule table 144, without querying the policy processor 150. This may provide a significant speedup.

If, on the other hand, there is no match, the tag processing hardware 140 may query the policy processor 150, and may install a response from the policy processor 150 into the rule table 144 for potential future use. Thus, the rule table 144 may function as a cache. However, it should be appreciated that aspects of the present disclosure are not limited to implementing the rule table 144 as a cache.

In some embodiments, the tag processing hardware 140 may form a hash key based on one or more input metadata tags, and may present the hash key to the rule table 144. If there is no match, the tag processing hardware 140 may send an interrupt signal to the policy processor 150. In response to the interrupt signal, the policy processor 150 may fetch metadata from one or more input registers (e.g., where the one or more input metadata tags are stored), process the fetched metadata, and write one or more results to one or more output registers. The policy processor 150 may then signal to the tag processing hardware 140 that the one or more results are available.

In some embodiments, if the tag processing hardware 140 determines that an instruction (e.g., a store instruction) should be allowed (e.g., based on a hit in the rule table 144, or a miss in the rule table 144, followed by a response from the policy processor 150 indicating no policy violation has been found), the tag processing hardware 140 may indicate to the write interlock 112 that a result of executing the instruction (e.g., a value to be stored) may be written back to memory. Additionally, or alternatively, the tag processing hardware 140 may update the metadata memory 125, the tag map table 142, and/or the tag register file 146 with one or more output metadata tags (e.g., as received from the rule table 144 or the policy processor 150). As one example, for a store instruction, the metadata memory 125 may be updated based on an address translation by the tag map table 142. For instance, an application memory address referenced by the store instruction may be used to look up a metadata memory address from the tag map table 142, and metadata received from the rule table 144 or the policy processor 150 may be stored to the metadata memory 125 at the metadata memory address. As another example, where metadata to be updated is stored in an entry in the tag map table 142 (as opposed to being stored in the metadata memory 125), that entry in the tag map table 142 may be updated. As another example, for an arithmetic instruction, an entry in the tag register file 146 corresponding to a register used by the host processor 110 for storing a result of executing the arithmetic instruction may be updated with an appropriate metadata tag.

In some embodiments, if the tag processing hardware 140 determines that the instruction represents a policy violation (e.g., based on a miss in the rule table 144, followed by a response from the policy processor 150 indicating a policy violation has been found), the tag processing hardware 140 may indicate to the write interlock 112 that a result of executing the instruction should be discarded, instead of being written back to memory. Additionally, or alternatively, the tag processing hardware 140 may send an interrupt to the host processor 110. In response to receiving the interrupt, the host processor 110 may switch to any suitable violation processing code. For example, the host processor 100 may halt, reset, log the violation and continue, perform an integrity check on application code and/or application data, notify an operator, etc.

In some embodiments, the rule table 144 may be implemented with a hash function and a designated portion of a memory (e.g., the metadata memory 125). For instance, a hash function may be applied to one or more inputs to the rule table 144 to generate an address in the metadata memory 125. A rule table entry corresponding to the one or more inputs may be stored to, and/or retrieved from, that address in the metadata memory 125. Such an entry may include the one or more inputs and/or one or more corresponding outputs, which may be computed from the one or more inputs at run time, load time, link time, or compile time.

In some embodiments, the tag processing hardware 140 may include one or more configuration registers. Such a register may be accessible (e.g., by the policy processor 150) via a configuration interface of the tag processing hardware 140. In some embodiments, the tag register file 146 may be implemented as configuration registers. Additionally, or alternatively, there may be one or more application configuration registers and/or one or more metadata configuration registers.

Although details of implementation are shown in FIG. 1 and described above, it should be appreciated that aspects of the present disclosure are not limited to the use of any particular component, or combination of components, or to any particular arrangement of components. For instance, in some embodiments, one or more functionalities of the policy processor 150 may be performed by the host processor 110. As an example, the host processor 110 may have different operating modes, such as a user mode for user applications and a privileged mode for an operating system. Policy-related code (e.g., tagging, evaluating policies, etc.) may run in the same privileged mode as the operating system, or a different privileged mode (e.g., with even more protection against privilege escalation).

Figure 2:
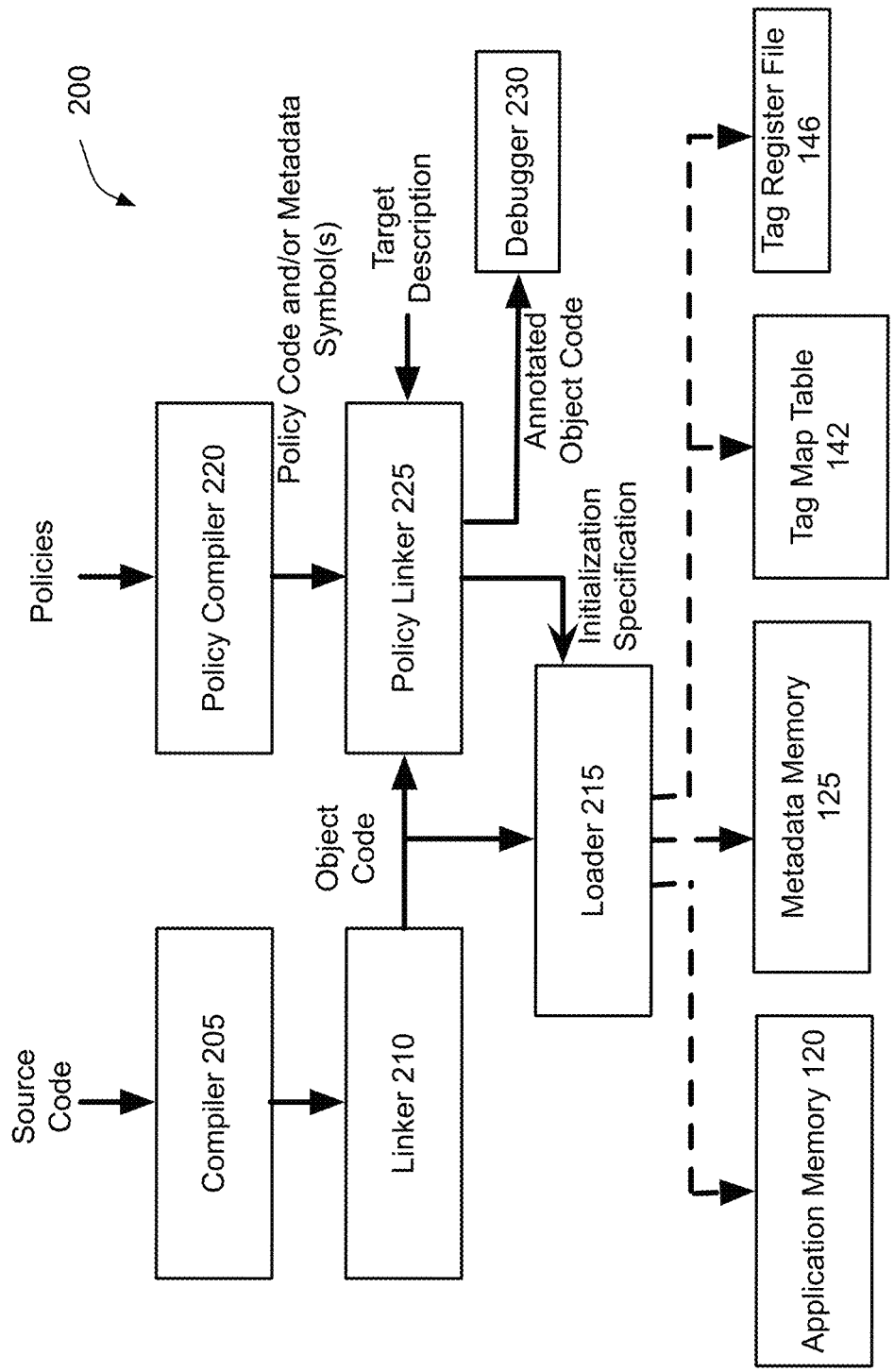
FIG. 2 shows an illustrative software system 200 for enforcing policies, in accordance with some embodiments.

FIG. 2 shows an illustrative software system 200 for enforcing policies, in accordance with some embodiments. For instance, the software system 200 may be programmed to generate executable code and/or load the executable code into the illustrative hardware system 100 in the example of FIG. 1.

In the example shown in FIG. 2, the software system 200 includes a software toolchain having a compiler 205, a linker 210, and a loader 215. The compiler 205 may be programmed to process source code into executable code, where the source code may be in a higher-level language and the executable code may be in a lower level language. The linker 210 may be programmed to combine multiple object files generated by the compiler 205 into a single object file to be loaded by the loader 215 into memory (e.g., the illustrative application memory 120 in the example of FIG. 1). Although not shown, the object file output by the linker 210 may be converted into a suitable format and stored in persistent storage, such as flash memory, hard disk, read-only memory (ROM), etc. The loader 215 may retrieve the object file from the persistent storage, and load the object file into random-access memory (RAM).

In some embodiments, the compiler 205 may be programmed to generate information for use in enforcing policies. For instance, as the compiler 205 translates source code into executable code, the compiler 205 may generate information regarding data types, program semantics and/or memory layout. As one example, the compiler 205 may be programmed to mark a boundary between one or more instructions of a function and one or more instructions that implement calling convention operations (e.g., passing one or more parameters from a caller function to a callee function, returning one or more values from the callee function to the caller function, storing a return address to indicate where execution is to resume in the caller function's code when the callee function returns control back to the caller function, etc.). Such boundaries may be used, for instance, during initialization to tag certain instructions as function prologue or function epilogue. At run time, a stack policy may be enforced so that, as function prologue instructions execute, certain locations in a call stack (e.g., where a return address is stored) may be tagged as FRAME locations, and as function epilogue instructions execute, the FRAME metadata tags may be removed. The stack policy may indicate that instructions implementing a body of the function (as opposed to function prologue and function epilogue) only have read access to FRAME locations. This may prevent an attacker from overwriting a return address and thereby gaining control.

As another example, the compiler 205 may be programmed to perform control flow analysis, for instance, to identify one or more control transfer points and respective destinations. Such information may be used in enforcing a control flow policy. As yet another example, the compiler 205 may be programmed to perform type analysis, for example, by applying type labels such as Pointer, Integer, Floating-Point Number, etc. Such information may be used to enforce a policy that prevents misuse (e.g., using a floating-point number as a pointer).

Although not shown in FIG. 2, the software system 200 may, in some embodiments, include a binary analysis component programmed to take, as input, object code produced by the linker 210 (as opposed to source code), and perform one or more analyses similar to those performed by the compiler 205 (e.g., control flow analysis, type analysis, etc.).

In the example of FIG. 2, the software system 200 further includes a policy compiler 220 and a policy linker 225. The policy compiler 220 may be programmed to translate one or more policies written in a policy language into policy code. For instance, the policy compiler 220 may output policy code in C or some other suitable programming language. Additionally, or alternatively, the policy compiler 220 may output one or more metadata labels referenced by the one or more policies. At initialization, such a metadata label may be associated with one or more memory locations, registers, and/or other machine state of a target system, and may be resolved into a binary representation of metadata to be loaded into a metadata memory or some other hardware storage (e.g., registers) of the target system. As described above, such a binary representation of metadata, or a pointer to a location at which the binary representation is stored, is sometimes referred to herein as a "metadata tag."

It should be appreciated that aspects of the present disclosure are not limited to resolving metadata labels at load time. In some embodiments, one or more metadata labels may be resolved statically (e.g., at compile time or link time). For example, the policy compiler 220 may process one or more applicable policies, and resolve one or more metadata labels defined by the one or more policies into a statically-determined binary representation. Additionally, or alternatively, the policy linker 225 may resolve one or more metadata labels into a statically-determined binary representation, or a pointer to a data structure storing a statically-determined binary representation. The inventors have recognized and appreciated that resolving metadata labels statically may advantageously reduce load time processing. However, aspects of the present disclosure are not limited to resolving metadata labels in any particular manner.

In some embodiments, the policy linker 225 may be programmed to process object code (e.g., as output by the linker 210), policy code (e.g., as output by the policy compiler 220), and/or a target description, to output an initialization specification. The initialization specification may be used by the loader 215 to securely initialize a target system having one or more hardware components (e.g., the illustrative hardware system 100 in the example of FIG. 1) and/or one or more software components (e.g., an operating system, one or more user applications, etc.).

In some embodiments, the target description may include descriptions of a plurality of named entities. A named entity may represent a component of a target system. As one example, a named entity may represent a hardware component, such as a configuration register, a program counter, a register file, a timer, a status flag, a memory transfer unit, an input/output device, etc. As another example, a named entity may represent a software component, such as a function, a module, a driver, a service routine, etc.

In some embodiments, the policy linker 225 may be programmed to search the target description to identify one or more entities to which a policy pertains. For instance, the policy may map certain entity names to corresponding metadata labels, and the policy linker 225 may search the target description to identify entities having those entity names. The policy linker 225 may identify descriptions of those entities from the target description, and use the descriptions to annotate, with appropriate metadata labels, the object code output by the linker 210. For instance, the policy linker 225 may apply a Read label to a .rodata section of an Executable and Linkable Format (ELF) file, a Read label and a Write label to a .data section of the ELF file, and an Execute label to a .text section of the ELF file. Such information may be used to enforce a policy for memory access control and/or executable code protection (e.g., by checking read, write, and/or execute privileges).

It should be appreciated that aspects of the present disclosure are not limited to providing a target description to the policy linker 225. In some embodiments, a target description may be provided to the policy compiler 220, in addition to, or instead of, the policy linker 225. The policy compiler 220 may check the target description for errors. For instance, if an entity referenced in a policy does not exist in the target description, an error may be flagged by the policy compiler 220. Additionally, or alternatively, the policy compiler 220 may search the target description for entities that are relevant for one or more policies to be enforced, and may produce a filtered target description that includes entities descriptions for the relevant entities only. For instance, the policy compiler 220 may match an entity name in an "init" statement of a policy to be enforced to an entity description in the target description, and may remove from the target description (or simply ignore) entity descriptions with no corresponding "init" statement.

In some embodiments, the loader 215 may initialize a target system based on an initialization specification produced by the policy linker 225. For instance, referring to the example of FIG. 1, the loader 215 may load data and/or instructions into the application memory 120, and may use the initialization specification to identify metadata labels associated with the data and/or instructions being loaded into the application memory 120. The loader 215 may resolve the metadata labels in the initialization specification into respective binary representations. However, it should be appreciated that aspects of the present disclosure are not limited to resolving metadata labels at load time. In some embodiments, a universe of metadata labels may be known during policy linking, and therefore metadata labels may be resolved at that time, for example, by the policy linker 225. This may advantageously reduce load time processing of the initialization specification.

In some embodiments, the policy linker 225 and/or the loader 215 may maintain a mapping of binary representations of metadata back to human readable versions of metadata labels. Such a mapping may be used, for example, by a debugger 230. For instance, in some embodiments, the debugger 230 may be provided to display a human readable version of an initialization specification, which may list one or more entities and, for each entity, a set of one or more metadata symbols associated with the entity. Additionally, or alternatively, the debugger 230 may be programmed to display assembly code annotated with metadata labels, such as assembly code generated by disassembling object code annotated with metadata labels. During debugging, the debugger 230 may halt a program during execution, and allow inspection of entities and/or metadata tags associated with the entities, in human readable form. For instance, the debugger 230 may allow inspection of entities involved in a policy violation and/or metadata tags that caused the policy violation. The debugger 230 may do so using the mapping of binary representations of metadata back to metadata labels.

In some embodiments, a conventional debugging tool may be extended to allow review of issues related to policy enforcement, for example, as described above. Additionally, or alternatively, a stand-alone policy debugging tool may be provided.

In some embodiments, the loader 215 may load the binary representations of the metadata labels into the metadata memory 125, and may record the mapping between application memory addresses and metadata memory addresses in the tag map table 142. For instance, the loader 215 may create an entry in the tag map table 142 that maps an application memory address where an instruction is stored in the application memory 120, to a metadata memory address where metadata associated with the instruction is stored in the metadata memory 125. Additionally, or alternatively, the loader 215 may store metadata in the tag map table 142 itself (as opposed to the metadata memory 125), to allow access without performing any memory operation.

In some embodiments, the loader 215 may initialize the tag register file 146 in addition to, or instead of, the tag map table 142. For instance, the tag register file 146 may include a plurality of registers corresponding, respectively, to a plurality of entities. The loader 215 may identify, from the initialization specification, metadata associated with the entities, and store the metadata in the respective registers in the tag register file 146.

Referring again to the example of FIG. 1, the loader 215 may, in some embodiments, load policy code (e.g., as output by the policy compiler 220) into the metadata memory 125 for execution by the policy processor 150. Additionally, or alternatively, a separate memory (not shown in FIG. 1) may be provided for use by the policy processor 150, and the loader 215 may load policy code and/or associated data into the separate memory.

In some embodiments, a metadata label may be based on multiple metadata symbols. For instance, an entity may be subject to multiple policies, and may therefore be associated with different metadata symbols corresponding, respectively, to the different policies. The inventors have recognized and appreciated that it may be desirable that a same set of metadata symbols be resolved by the loader 215 to a same binary representation (which is sometimes referred to herein as a "canonical" representation). For instance, a metadata label {A, B, C} and a metadata label {B, A, C} may be resolved by the loader 215 to a same binary representation. In this manner, metadata labels that are syntactically different but semantically equivalent may have the same binary representation.

The inventors have further recognized and appreciated it may be desirable to ensure that a binary representation of metadata is not duplicated in metadata storage. For instance, as described above, the illustrative rule table 144 in the example of FIG. 1 may map input metadata tags to output metadata tags, and, in some embodiments, the input metadata tags may be metadata memory addresses where binary representations of metadata are stored, as opposed to the binary representations themselves. The inventors have recognized and appreciated that if a same binary representation of metadata is stored at two different metadata memory addresses X and Y, the rule table 144 may not recognize an input pattern having the metadata memory address Y as matching a stored mapping having the metadata memory address X. This may result in a large number of unnecessary rule table misses, which may degrade system performance.

Moreover, the inventors have recognized and appreciated that having a one-to-one correspondence between binary representations of metadata and their storage locations may facilitate metadata comparison. For instance, equality between two pieces of metadata may be determined simply by comparing metadata memory addresses, as opposed to comparing binary representations of metadata. This may result in significant performance improvement, especially where the binary representations are large (e.g., many metadata symbols packed into a single metadata label).

Accordingly, in some embodiments, the loader 215 may, prior to storing a binary representation of metadata (e.g., into the illustrative metadata memory 125 in the example of FIG. 1), check if the binary representation of metadata has already been stored. If the binary representation of metadata has already been stored, instead of storing it again at a different storage location, the loader 215 may refer to the existing storage location. Such a check may be done at startup and/or when a program is loaded subsequent to startup (with or without dynamic linking).

Additionally, or alternatively, a similar check may be performed when a binary representation of metadata is created as a result of evaluating one or more policies (e.g., by the illustrative policy processor 150 in the example of FIG. 1). If the binary representation of metadata has already been stored, a reference to the existing storage location may be used (e.g., installed in the illustrative rule table 144 in the example of FIG. 1).

In some embodiments, the loader 215 may create a hash table mapping hash values to storage locations. Before storing a binary representation of metadata, the loader 215 may use a hash function to reduce the binary representation of metadata into a hash value, and check if the hash table already contains an entry associated with the hash value. If so, the loader 215 may determine that the binary representation of metadata has already been stored, and may retrieve, from the entry, information relating to the binary representation of metadata (e.g., a pointer to the binary representation of metadata, or a pointer to that pointer). If the hash table does not already contain an entry associated with the hash value, the loader 215 may store the binary representation of metadata (e.g., to a register or a location in a metadata memory), create a new entry in the hash table in association with the hash value, and store appropriate information in the new entry (e.g., a register identifier, a pointer to the binary representation of metadata in the metadata memory, a pointer to that pointer, etc.). However, it should be appreciated that aspects of the present disclosure are not limited to the use of a hash table for keeping track of binary representations of metadata that have already been stored. Additionally, or alternatively, other data structures may be used, such as a graph data structure, an ordered list, an unordered list, etc. Any suitable data structure or combination of data structures may be selected based on any suitable criterion or combination of criteria, such as access time, memory usage, etc.

It should be appreciated that the techniques introduced above and/or described in greater detail below may be implemented in any of numerous ways, as these techniques are not limited to any particular manner of implementation. Examples of implementation details are provided herein solely for purposes of illustration. Furthermore, the techniques described herein may be used individually or in any suitable combination, as aspects of the present disclosure are not limited to any particular technique or combination of techniques.

For instance, while examples are described herein that include a compiler (e.g., the illustrative compiler 205 and/or the illustrative policy compiler 220 in the example of FIG. 2), it should be appreciated that aspects of the present disclosure are not limited to using a compiler. In some embodiments, a software toolchain may be implemented as an interpreter. For example, a lazy initialization scheme may be implemented, where one or more default labels (e.g., DEFAULT, PLACEHOLDER, etc.) may be used for tagging at startup, and a policy processor (e.g., the illustrative policy processor 150 in the example of FIG. 1) may evaluate one or more policies and resolve the one or more default labels in a just-in-time manner.

As described above in connection with the example of FIG. 1, one or more instructions executed by the illustrative host processor 110 may be checked by the illustrative tag processing hardware 140 to determine if the one or more instructions should be allowed. In some embodiments, the one or more instructions (or, as described below, one or more transformed instructions) may be placed in a queue of instructions to be checked by the tag processing hardware 140. Additionally, or alternatively, a result of executing the one or more instructions may be placed in a queue of the illustrative write interlock 112 while the tag processing hardware 140 checks the one or more instructions (or the one or more transformed instructions). If the tag processing hardware 140 determines that the one or more instructions should be allowed, the result may be released from the queue of the write interlock 112 and written into the illustrative application memory 120.

In some instances, a result queue of the write interlock 112 and/or an instruction queue of the tag processing hardware 140 may become full. When that occurs, an execution result may be written into the application memory 120, even though one or more corresponding instructions have not been checked by the tag processing hardware 140. This may create a security vulnerability. For instance, an attacker may cause the host processor 110 to execute a large number of instructions in quick succession, so as to fill up the result queue and/or the instruction queue. The attacker may then cause execution of malicious code that otherwise would have been disallowed by the tag processing hardware 140. To avoid such an attack, it may be desirable to stall the host processor 110 temporarily to allow the tag processing hardware 140 to catch up.

In some embodiments, stalling may be effectuated by preventing the host processor 110 from accessing the application memory 120. For instance, when the result queue of the write interlock 112 is filled to a selected threshold level, a signal may be triggered to cause a bus to stop responding to the host processor's memory access requests. Additionally, or alternatively, a similar signal may be triggered when the instruction queue of the tag processing hardware 140 is filled to a selected threshold level. In this manner, the tag processing hardware 140 may check instructions already executed by the host processor (e.g., by checking the executed instructions and/or corresponding transformed instructions) while the host processor 110 waits for the bus to respond.

FIG. 3A shows an illustrative hardware interface 300, in accordance with some embodiments. The hardware interface 300 may coordinate interactions between a host processor (e.g., the illustrative host processor 110 in the example of FIG. 1) and tag processing hardware (e.g., the illustrative tag processing hardware 140 in the example of FIG. 1). For instance, the hardware interface 300 may transform an instruction in an ISA of the host processor 110 into one or more instructions in an ISA of the tag processing hardware 140. Illustrative techniques for transforming instructions are described in International Patent Application No. PCT/US2019/016276, filed on Feb. 1, 2019, entitled "SYSTEMS AND METHODS FOR TRANSFORMING INSTRUCTIONS FOR METADATA PROCESSING," which is incorporated herein by reference in its entirety. However, it should be appreciated that aspects of the present disclosure are not limited to any particular technique for instruction transformation, or to any instruction transformation at all.

In some embodiments, the host processor 110 may, via a host processor trace interface, inform the hardware interface 300 that an instruction has been executed by the host processor 110. The hardware interface 300 may in turn inform the tag processing hardware 140 via a tag processing trace interface. The tag processing hardware 140 may place an instruction in an instruction queue 148, which may hold instructions to be checked by the tag processing hardware 140 and/or a policy processor (e.g., the illustrative policy processor 150 in the example of FIG. 1). The instruction placed into the instruction queue 148 may have been received directly from the host processor 110, or may be a result of instruction transformation performed by the hardware interface 300.

The inventors have recognized and appreciated that the host processor 110 may, in some instances, execute instructions at a faster clocking rate than a clocking rate of the tag processing hardware 140. For instance, a dual-issue superscalar host processor may produce up to two instruction trace structures every nanosecond, whereas the tag processing hardware 140 may have a clock period of 2 nanoseconds.

Accordingly, in some embodiments, the hardware interface 300 may transform a trace received via the host processor trace interface, so that a transformed trace presented at the tag processing trace interface may match the clock period of the tag processing hardware 140. As an example, if the host processor 110 produces two instruction trace structures every nanosecond, four instruction trace structures, accumulated over two clock periods of the host processor 110, may be presented at the tag processing trace interface every 2 nanoseconds. The tag processing hardware 140 may process these four instruction trace structures in parallel. Thus, the tag processing hardware 140 may check more instructions in parallel than the host processor 110 executes in parallel.

The inventors have recognized and appreciated that, in some instances, the host processor 110 may perform hazard detection on application data, so that there may be no application data dependency between instructions that are retired by the host processor 110 in parallel. Therefore, if instructions checked by the tag processing hardware 140 in parallel always correspond to instructions executed by the host processor 110 in parallel, the tag processing hardware 140 may rely on the host processor 110's consistency guarantee for application data.

If, however, instructions checked by the tag processing hardware 140 in parallel do not always correspond to instructions executed by the host processor 110 in parallel (e.g., if the tag processing hardware 140 checks more instructions in parallel than the host processor 110 executes in parallel), it may be advantageous for the tag processing hardware 140 to perform additional hazard detection.

Moreover, the inventors have recognized and appreciated that, even if there is no application data dependency between a first instruction and a second instruction, there may be metadata dependency. As an example, processing of the first instruction by the tag processing hardware may cause an update to an environment tag (e.g., a tag for a program counter). As another example, the first instruction may be a load instruction, and processing of the first instruction by the tag processing hardware 140 may cause an update to a tag for an application memory address from which data is loaded. Such a metadata update may impact an outcome of the tag processing hardware 140's processing of the second instruction.

Accordingly, in some embodiments, the tag processing hardware 140 may perform hazard detection to prevent out-of-order metadata updates. For instance, the host processor 110 may produce instruction trace structures $<I_0, I_1>$ at the first nanosecond and $<I_2, I_3>$ at the second nanosecond. A serialized ordering of these structures may be $<I_0, I_1, I_2, I_3>$. While the tag processing hardware 140 may check all four structures in parallel, the tag processing hardware 140 may maintain metadata dependencies based on the serialized ordering. As an example, if a metadata update for a register, a memory word, a program counter, etc. occurs as a result of checking the instruction $I_0$, the remaining instructions (i.e., $I_1, I_2, I_3$) may be checked with that metadata update taken into account.

In some embodiments, the hardware interface 300 may include a write interlock (e.g., the illustrative write interlock 112 in the example of FIG. 1). Illustrative techniques for write interlocking are described in International Patent Application No. PCT/US2019/016317, filed on Feb. 1, 2019, entitled "SYSTEMS AND METHODS FOR POST CACHE INTERLOCKING," which is incorporated herein by reference in its entirety. However, it should be appreciated that aspects of the present disclosure are not limited to any particular technique for write interlocking, or to any write interlocking at all.

The inventors have recognized and appreciated that write interlock designs may be adapted to be compatible with different host processor designs. Therefore, it may be desirable to include the write interlock 112 as part of the hardware interface 300, so that the tag processing hardware 140 may be provided in a manner that is independent of host processor design. However, it should be appreciated that aspects of the present disclosure are not limited to any particular component, or any particular arrangement of components. In some embodiments, the write interlock 112 may be part of the tag processing hardware 140. Additionally, or alternatively, any one or more functionalities described herein in connection with the hardware interface 300 may be performed by the tag processing hardware 140.

In some embodiments, the write interlock 112 may include a result queue 114 for storing execution results while instructions that produced the results are being checked by the tag processing hardware 140 and/or the policy processor 150. If an instruction is allowed (e.g., a store instruction), a corresponding result (e.g., a value to be stored) may be released from the result queue 114 and written into an application memory (e.g., the illustrative application memory 120 in the example of FIG. 1).

In some embodiments, the host processor 110 may access the application memory 120 via a bus 115. The bus 115 may implement any suitable protocol, such as Advanced eXtensible Interface (AXI). For instance, to read an instruction or a piece of data from the application memory 120, the host processor 110 may send a read request to the bus 115 with an address where the instruction or data is stored. The bus 115 may perform a handshake, for example, by asserting a VALID signal at a processor-side interface and a READY signal at a memory-side interface. When both signals are high, the address may be transmitted to the application memory 120. When the application memory 120 returns the requested instruction or data, the bus 115 may perform another handshake, for example, by asserting a VALID signal at the memory-side interface and a READY signal at the processor-side interface. When both signals are high, the requested instruction or data may be transmitted to the host processor 110.

Additionally, or alternatively, to write an instruction or a piece of data to the application memory 120, the host processor 110 may send a write request to the bus 115 with an address where the instruction or data is to be written. The bus 115 may perform a first handshake, for example, by asserting a VALID signal at a processor-side interface and a READY signal at a memory-side interface. When both signals are high, the address may be transmitted to the application memory 120. The bus 115 may perform a second handshake, for example, by asserting a VALID signal at the processor-side interface and a READY signal at the memory-side interface. When both signals are high, the instruction or data to be written may be transmitted to the application memory 120. When the application memory 120 responds with an acknowledgment that the instruction or data has been written at the indicated address, the bus 115 may perform a third handshake, for example, by asserting a VALID signal at the memory-side interface and a READY signal at the processor-side interface. When both signals are high, the acknowledgment may be transmitted to the host processor 110.

As described above, it may, in some instances, be desirable to stall the host process 110 (e.g., to allow the tag processing hardware 140 to catch up). The inventors have recognized and appreciated that the host processor 110 may be stalled by asserting a stall signal to cause the bus 115 to stop responding to memory access requests from the host processor 110.

Figure 3B:
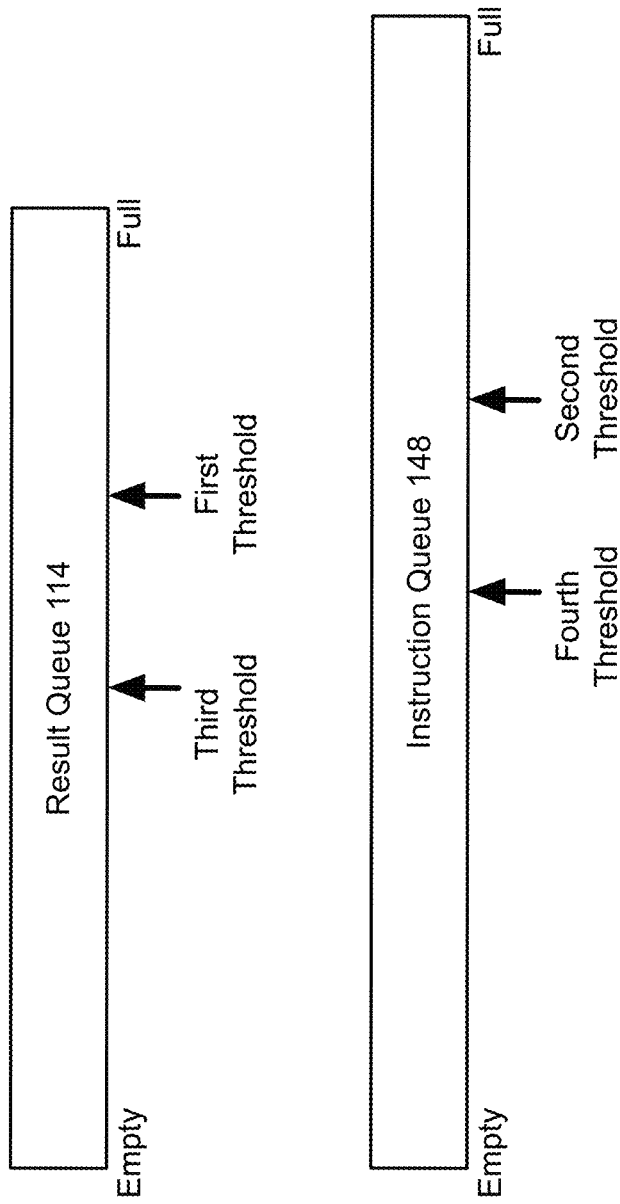
FIG. 3B shows the illustrative result queue 114 and the illustrative instruction queue 148 in the example of FIG. 3A, in accordance with some embodiments.

FIG. 3B shows illustrative first and third threshold levels for the illustrative result queue 114 in the example of FIG. 3A, as well as illustrative second and fourth threshold levels for the illustrative instruction queue 148 in the example of FIG. 3A, in accordance with some embodiments. One or more of these thresholds may be used to determine when to assert or de-assert a stall signal at the bus 115.

In some embodiments, the hardware interface 300 may determine that the tag processing hardware 140 is falling behind the host processor 110. For example, the hardware interface 300 may determine that the result queue 114 of the write interlock 112 is filled to a first threshold level, or that the instruction queue 148 of the tag processing hardware 140 is filled to a second threshold level. In response, the hardware interface 300 may send a STALL signal to the bus 115, which may use the STALL signal to gate a VALID signal and/or a READY signal in a handshake. This may prevent the handshake from being successful until the STALL signal is de-asserted, which may happen when the result queue 114 drops below a third threshold level (which may be lower than the first threshold level), or when the instruction queue 148 drops below a fourth threshold level (which may be lower than the second threshold level).

Although details of implementation are shown in FIGS. 3A-B and described above, it should be appreciated that aspects of the present disclosure are not limited to any particular manner of implementation. For instance, in some embodiments, a man-in-the-middle approach may be used instead of, or in addition to, gating a bus handshake. For example, a hardware component may be inserted between the host processor 110 and the bus 115. The hardware component may accept from the host processor 110 a request with an address from which an instruction or a piece of data is to be read (or to which an instruction or a piece of data is to be written), but may refrain from forwarding the address to the bus 115 until the tag processing hardware 140 has caught up.

It should also be appreciated that not all components may be shown in FIGS. 3A-B. For instance, the tag processing hardware 140 may include one or more components (e.g., the illustrative tag map table 142, the illustrative rule table 144, and/or the illustrative tag register file 146 in the example of FIG. 1) in addition to, or instead of the instruction queue 148.

The inventors have recognized and appreciated that, in some instances, after one or more instructions are determined to represent a policy violation, a result of executing the one or more instructions may remain in the illustrative result queue 114 in the example of FIG. 3A until some suitable violation processing code has made a decision with respect to the result. For example, the violation processing code may decide to discard the result, or allow the result to be written via the illustrative bus 115 to the illustrative application memory 120).

The inventors have further recognized and appreciated that, when the illustrative host processor 110 begins to execute the violation processing code, the illustrative tag processing hardware 140 may still be checking one or more other instructions. For instance, there may be one or more instructions in the illustrative instruction queue 148, waiting to be checked by the tag processing hardware 140. Additionally, or alternatively, one or more corresponding results may be held in the result queue 114, waiting for approval to be written to memory.

In some instances, the tag processing hardware 140 may find another violation in at least one instruction that is in the instruction queue 148 when the host processor 100 begins to execute violation processing code for an earlier violation. This may trigger execution of violation processing code for the later violation, and a result of the later violation may remain in the result queue 114 until the violation processing code for the later violation finishes. However, the violation processing code for the later violation may be unable to proceed because the violation processing code for the earlier violation has not finished. At the same time, the violation processing code for the earlier violation may be unable to proceed because the violation processing code for the earlier violation may cause a write transaction, which may be queued into the result queue 114 behind the result of the later violation. This write transaction may be blocked until the result of the later violation is cleared from the result queue 114.

Accordingly, in some embodiments, violation processing code may not be placed into the instruction queue 148, and therefore may not checked by the tag processing hardware 140. Additionally, or alternatively, memory writes of the violation processing code may proceed without being held in the result queue 114. In this manner, memory writes of violation processing code for an earlier violation may not be blocked by a pending memory write of a later violation.

However, the inventors have recognized and appreciated that violation processing code may still be blocked in some instances, even if the violation processing code itself is not checked by the tag processing hardware 140. For example, the host processor 110 may use a cache in executing the violation processing code, and a result of an instruction that is being checked by the tag processing hardware 140 may be stored in the same cache. The instruction may turn out to be a violation, and an eviction of a cache line storing the result of the instruction may be blocked, which may in turn block the violation processing code.

Accordingly, in some embodiments, violation processing code may use only un-cached memory, so that the violation processing code for an earlier violation may not be blocked by a pending cache eviction of a later violation.

However, the inventors have recognized and appreciated that violation processing code may still be blocked in some instances, even if the violation processing code does not use any cached memory, and is not checked by the tag processing hardware 140. For example, some bus interfaces do not provide a way to abort a transfer after a request for the transfer has been made, even if the request has not been granted yet. As a result, a bus may be hung if a request is made for a cache writeback or a non-cached write before the violation processing code, but the request is then stalled by the illustrative write interlock 112 in the example of FIG. 1 due to a policy violation.

Accordingly, in some embodiments, all memory writes pending checking may be intercepted and buffered, so that no request may be made on a bus for a memory write until one or more corresponding instructions have been checked for policy violation. For instance, a hardware component may be provided to packetize a memory write with any suitable information, such as a target memory address, a size of data to be written, a length of transaction burst, a burst type (e.g., fixed, incrementing, wrap-around, etc.), a transaction beat size, one or more bus interface (e.g., AXI) write identifiers, one or more memory region identifiers, one or more quality of service settings, the data to be written, etc. This information may be stored in memory, and may be used to re-issue a request for the memory write if and when one or more corresponding instructions have been checked for policy violation.

However, the inventors have recognized and appreciated that the above-described approach may involve additional hardware and/or memory footprint, which may be undesirable in some instances. Accordingly, in some embodiments, techniques are provided for clearing the instruction queue 148 and/or the result queue 114 upon detection of a policy violation. This may eliminate or reduce a risk of violation processing code being blocked without increasing hardware or memory footprint.

FIG. 4 shows an illustrative process 400 for violation processing, in accordance with some embodiments. For instance, the process 400 may be performed by the illustrative tag processing hardware 140 in the example of FIG. 1 to continue checking one or more instructions after detecting a policy violation.

At act 405, in response to detecting a policy violation, the tag processing hardware 140 may enter a violation processing mode. As an example, a query constructed based on an instruction may result in a miss in the illustrative rule table 144 in the example of FIG. 1, and the illustrative policy processor 150 may be invoked to check the instruction. In response to detecting a policy violation, the policy processor 150 may place the tag processing hardware 140 in a violation processing mode. Additionally, or alternatively, the policy processor 150 may record a memory address accessed by the instruction that is found to be a policy violation.

As another example, a complete rule set may be installed in the rule table 144, so that the tag processing hardware 140 may infer a policy violation from a miss in the rule table 144, and may, accordingly, enter a violation processing mode. Additionally, or alternatively, the tag processing hardware 140 may record a memory address accessed by the instruction that is found to be a policy violation.

At act 410, upon entering a violation processing mode, the tag processing hardware 140 may send a signal to the illustrative host processor 110 in the example of FIG. 1 to trigger violation processing code. However, in some embodiments, the violation processing code may be paused until the tag processing hardware 140 finishes checking all instructions in the illustrative instruction queue 148. For instance, the violation processing code may include prologue code that reads a selected register in the illustrative hardware interface 300 in the example of FIG. 3A. This read may be stalled by the hardware interface 300, thereby stalling the violation processing code. However, it should be appreciated that aspects of the present disclosure are not limited to stalling the violation processing code in any particular manner, or at all.

Meanwhile, at act 415, the tag processing hardware 140 may continue to check instructions in the instruction queue 148. In some embodiments, if any of these instructions is found to be a policy violation, a memory address accessed by the instruction may be recorded (e.g., by the policy processor 150 or the tag processing hardware 140, as described above). In this manner, a record of memory addresses accessed by instructions that are found to be policy violations may be provided.

The inventors have recognized and appreciated that, because such a record of memory addresses may be provided only when a policy violation is found, it may not be economical to devote a large amount of silicon area to maintaining the record. Therefore, a software implementation (e.g., software running on the policy processor 150) may be more desirable in some instances.

However, it should be appreciated that aspects of the present disclosure are not limited to using software to maintain a record of memory addresses accessed by instructions that are found to be policy violations. Additionally, or alternatively, such a record may be maintained by hardware (e.g., the tag processing hardware 140 and/or the hardware interface 300).

It should also be appreciated that aspects of the present disclosure are not limited to maintaining such a record of while the tag processing hardware 140 is in a violation processing mode, or to maintaining such a record at all.

The inventors have recognized and appreciated that, in some instances, all operations after a policy violation may be suspect. Accordingly, in some embodiments, a record may be maintained for memory addresses accessed by all instructions (as opposed to just those that are found to be policy violations) while the tag processing hardware 140 is in a violation processing mode.

In some embodiments, one or more selected memory regions may be used to sequester data written by instructions that are found to be policy violations. Such sequestration may be performed while the tag processing hardware 140 is in a violation processing mode.

For instance, in some embodiments, if the tag processing hardware 140 is in a violation processing mode, the illustrative write interlock 112 in the example of FIG. 1 may forward a write transaction received from the host processor 110 to the policy processor 150, before the write transaction is passed to the illustrative bus 115. For example, the write interlock 112 may send, to the policy processor 150, a target memory address and/or a size of data to be written. The policy processor 150 may compare the target address received from the write interlock 112 against the record of memory addresses accessed by instructions that are found to be policy violations. If there is a match, the policy processor 150 may return an updated target address in a memory region for sequestration. The write interlock 112 may pass the updated target address to the bus 115, instead of the original target address, thereby redirecting the data to the memory region for sequestration. If there is no match, the policy processor 150 may simply return the original target address received from the write interlock 112.

In some embodiments, the policy processor 150 may, in case of a match, create a data structure in a memory region for sequestration. The data structure may include any suitable information regarding the write transaction, such as the original target address, a size of data to be written, a length of transaction burst, a burst type (e.g., fixed, incrementing, wrap-around, etc.), a transaction beat size, one or more bus interface (e.g., AXI) write identifiers, one or more memory region identifiers, one or more quality of service settings, etc.

In some embodiments, the data structure may include a segment allocated for the data to be written. The policy processor 150 may return to the write interlock 112 an address for the allocated segment, as an updated target address. The write interlock 112 may forward the updated target address to the bus 115, instead of the original target address, thereby redirecting the data to the allocated segment in the data structure created by the policy processor 150.

Additionally, or alternatively, the data structure may include a pointer to a data buffer, instead of the segment allocated for the data to be written, and the policy processor 150 may return an address stored in the pointer to the write interlock 112, as the updated target address.

The inventors have recognized and appreciated that, by providing an updated target address to the write interlock 112 to effectuate redirecting of data, hardware complexity of the write interlock 112 may be reduced. However, it should be appreciated that aspects of the present disclosure are not limited to redirecting data in any particular manner, or at all.

It also should be appreciated that aspects of the present disclosure are not limited to sequestering data attempted to be written by instructions that are found to be policy violations. In some embodiments, such data may simply be logged (e.g., for forensic analysis). For instance, the policy processor 150 may report such data to a user interface or a file, via a universal asynchronous receiver-transmitter (UART) print statement.

As described above, the record of memory addresses accessed by instructions that are found to be policy violations may be maintained by the tag processing hardware 140, in addition to, or instead of, by the policy processor 150. Accordingly, in some embodiments, sequestration of data may be performed by the tag processing hardware 140, in addition to, or instead of, by the policy processor 150.

It should be appreciated that aspects of the present disclosure are not limited to sequestering data written only by instructions that are found to be policy violations. The inventors have recognized and appreciated that, in some instances, all operations after a policy violation may be suspect. Accordingly, in some embodiments, data written by all instructions may be sequestered while the tag processing hardware 140 is in violation processing mode.

Additionally, or alternatively, a policy may be provided that, in response to detecting a policy violation, updates an environment tag (e.g., a tag for a program counter) to be in a violation state. Such a policy may flag all instructions as violations if the environment tag is in a violation state.

Thus, in some embodiments, the tag processing hardware 140 and/or the policy processor 150 may maintain a record of write transactions that are sequestered while the tag processing hardware 140 is in violation processing mode, including target addresses and/or data payloads of such write transactions. Such a record may be made available to violation processing code running on the host processor 110, and may be used for any suitable purpose. As one example, the violation processing code may use the target addresses and/or the corresponding data payloads for reporting and/or forensic analysis. As another example, the violation processing code may reissue a write request to the bus 115 using a target address and a corresponding data payload.

In some embodiments, the violation processing code may choose an intermediate course of action, such as terminating one or more processing threads associated with a write transaction that is found to be a policy violation. This may be accomplished in any suitable manner. For instance, the host processor 110 may map a process identifier of a current thread to process identifiers of one or more parent threads. Additionally, or alternatively, before switching to a next thread, the host processor 110 may check whether the tag processing hardware 140 has processed all instructions of a current thread. For example, the host processor 110 may check if a status register of the tag processing hardware 140 indicates the tag processing hardware 140 is empty.

Returning to the example of FIG. 4, once the instruction queue 148 is cleared up to a current instruction of the violation processing code, the tag processing hardware 140 may, at act 420, exit the violation processing mode, and normal processing may resume. The tag processing hardware 140 may recognize, in any suitable manner, an instruction as being associated with the violation processing code. For instance, the tag processing hardware 140 may determine if an address from which the instruction is fetched belongs to one or more memory regions associated with the violation processing code. Additionally, or alternatively, trace information received from the host processor 110 may indicate the instruction is associated with the violation processing code.

Although details of implementation are shown in FIG. 4 and described above, it should be appreciated that aspects of the present disclosure are not limited to any particular manner of implementation. For instance, in some embodiments, sequestration may be performed while the tag processing hardware 140 is not in violation processing mode.

Additionally, or alternatively, the tag processing hardware 140 may have no violation processing mode. In such an embodiment, the tag processing hardware 140 or the policy processor 150 may, in response to determining that an instruction violates at least one policy, identify a write interlock (e.g., the write interlock 112) where a write transaction is pending for the instruction. Such a write interlock, if found, may be instructed to discard the write transaction, or to redirect the write transaction to a sequestration address.

A write interlock where a write transaction is pending for a given instruction may be identified in any suitable manner. For instance, each of a plurality of write interlocks may be polled for addresses and/or one or more other properties of pending write transactions, to determine if there is a match for a data address of the instruction. Examples of properties that may be polled include, but are not limited to, a target memory address, a size of data to be written, a length of transaction burst, a burst type (e.g., fixed, incrementing, wrap-around, etc.), a transaction beat size, one or more bus interface (e.g., AXI) write identifiers, one or more memory region identifiers, one or more quality of service settings, etc.

As described above in connection with the example of FIG. 3A, the illustrative tag processing hardware 140 may check instructions executed by the illustrative host processor 110 and/or transformed instructions obtained based on the executed instructions. While the instructions are being checked, the illustrative write interlock 112 may hold corresponding execution results in the illustrative result queue 114. If an instruction is allowed, a corresponding result may be released from the result queue 114 and written into the illustrative application memory 120.

In some embodiments, upon receiving an instruction that stores to a data address, the tag processing hardware 140 may add the data address to a blocklist of data addresses. If the tag processing hardware 140 determines that the instruction is to be allowed, the data address may be removed from the blocklist. It should be appreciated that a blocklist may store multiple entries with a same data address. This may happen when, for example, multiple instructions that store to the same data address are being checked by the tag processing hardware 140.

In some embodiments, a blocklist maintained by the tag processing hardware 140 may be used by the write interlock 112 to determine which write transactions should be blocked. For instance, upon receiving a write transaction, the write interlock 112 may compare a target address of the write transaction against the blocklist. If there is a matching entry, the write interlock 112 may stall the write transaction.

In some embodiments, when a write transaction is first initiated by the host processor 110, the write interlock 112 may take a snapshot of a blocklist. In this manner, the write interlock 112 may be able to determine which entries are added to the blocklist before the write transaction is initiated, and/or which entries are added to the blocklist after the write transaction is initiated. The write interlock 112 may allow the write transaction to proceed when there is no longer any matching entry that is added before the write transaction is initiated.

In some embodiments, a blocklist may be implemented using a queue. However, the inventors have recognized and appreciated that the tag processing hardware 140 may finish checking instructions in an order that is different from an order in which corresponding data addresses enter the queue. Accordingly, in some embodiments, each entry in the queue may include a status bit indicating whether the entry is valid. When the write interlock 112 takes a snapshot, the snapshot may include only those entries that are valid.

In some embodiments, if the tag processing hardware 140 finishes checking an instruction, and a corresponding entry is at the head of the queue, the entry may be removed from the queue. Additionally, or alternatively, if the tag processing hardware 140 finishes checking an instruction, but a corresponding entry is not yet at the head of the queue, a status bit of the entry may be set to invalid. This may effectively remove the entry from the blocklist, even though the entry is not yet removed from the queue.

The inventors have recognized and appreciated that, in some instances, a blocklist may have a large number of entries. As a result, the write interlock 112 may perform a large number of comparisons to determine whether a write transaction is allowed to proceed. Accordingly, in some embodiments, hardware techniques may be provided to increase a number of blocklist entries that may be compared in a single clock cycle, thereby reducing latency of the write interlock 112. For instance, a hardware comparator may be provided for each blocklist entry. Additionally, or alternatively, blocklist entries may be stored in flip-flop structures, as opposed to random access memory (RAM).

However, the inventors have recognized and appreciated that the illustrative hardware techniques described above may be expensive in terms of chip area. Accordingly, in some embodiments, a portion of each data address, instead of the full data address, may be stored in a blocklist.

The inventors have further recognized and appreciated that, in some instances, maintaining a blocklist of all data addresses stored to by instructions being checked by the tag processing hardware 140 may be prohibitively expensive in terms of area and/or performance. Thus, in some embodiments, the write interlock 112 may use a blocklist to implement stalling of write transactions only for addresses that are cached by the host processor 110. Such an address may be in cacheable memory, and may be initialized as being cached.

Additionally, or alternatively, a smaller and/or faster mechanism may be used to determine whether to allow a non-cached write transaction to proceed (e.g., a write transaction to non-cacheable memory or a peripheral, or a write transaction to an address that is in cacheable memory but is not initialized as being cached).

The inventors have recognized and appreciated that, if N instructions have been executed by the host processor 110 when an execution result is added to the result queue 114, an instruction that produced the execution result must have been one of the N instructions executed by the host processor 110. Moreover, in many instances, the tag processing hardware 140 may check instructions according to an order in which the instructions are executed by the host process 110. Therefore, in such instances, the tag processing hardware 140 must have checked the instruction that produced the execution result when the tag processing hardware 140 has checked N instructions.

Accordingly, in some embodiments, the tag processing hardware 140 may maintain a first counter that counts a number of instructions that the host processor 110 has executed. Additionally, or alternatively, the tag processing hardware 140 may maintain a second counter that counts a number of instructions that the tag processing hardware 140 has checked.

In some embodiments, instructions executed by the host processor 110 may be transformed before being checked by the tag processing hardware 140. For instance, an instruction in a host ISA may be replaced by multiple instructions in a tag processing ISA. In that case, the tag processing hardware 140 may increment the second counter only after all of the multiple instructions have been checked. For instance, the multiple instructions may be arranged in a sequence, and each of the multiple instructions may include a flag indicating whether the instruction is a final instruction in the sequence. In this manner, the tag processing hardware 140 may increment the second counter only after the final instruction in the sequence has been checked.

Additionally, or alternatively, an instruction in a host ISA may be filtered out. In that case, the tag processing hardware 140 may increment the second counter immediately.

In some embodiments, in response to detecting an attempt by the host processor 110 to initiate a write transaction, the write interlock 112 may capture a current value of the first counter. The write interlock 112 may stall the write transaction until the second counter is equal to or greater than the captured value of the first counter.

For instance, the write transaction, along with the captured value of the first counter, may be placed into the result queue 114. Periodically (e.g., at every clock cycle), the write interlock 112 may check the second counter to determine if the second counter is equal to or greater than a counter value at the head of the result queue 114. If so, the write interlock 112 may release a corresponding write transaction at the head of the result queue 114.

Additionally, or alternatively, in response to detecting an attempt by the host processor 110 to initiate a write transaction, the write interlock 112 may send, to a quarantine block of the tag processing hardware 140, a request regarding the write transaction. In response to this request, the quarantine block may capture a current value of the first counter, and may wait until the second counter is equal to or greater than the captured value of the first counter before responding to the write interlock 112. The write interlock 112 may stall the write transaction until the quarantine block responds to the request.

The inventors have recognized and appreciated that the first counter and the second counter may each have a limited size, and may roll over when that size is reached. Moreover, since the first counter counts a number of instructions that the host processor 110 has executed, while the second counter counts a number of instructions that the tag processing hardware 140 has checked, the first counter may roll over before the second counter. Thus, there may be a window of time (e.g., after the first counter rolls over but before the second counter rolls over) during which a value of the first counter may be smaller than a value of the second counter, even though the tag processing hardware 140 has not caught up with the host processor 110.

Accordingly, in some embodiments, the first counter and the second counter may each have a size 2 M, where M is a capacity of the tag processing hardware 140 (e.g., including one or more queues and/or pipeline stages of the tag processing hardware 140). The write interlock 112 may release a write transaction at the head of the result queue 114 when it is determined that: (1) the second counter is equal to or greater than a counter value at the head of the result queue 114, and (2) a difference between the counter value at the head of the result queue 114 and the second counter is no more than M. In this manner, the write transaction may be released only when the tag processing hardware 140 has caught up with the host processor 110.

The inventors have recognized and appreciated that a blocklist-based approach may provide higher performance (but with more chip area), whereas a counter-based approach may use less chip area (but with lower performance).

The inventors have further recognized and appreciated that, for a cache write-back transaction, a corresponding instruction may have been placed into the illustrative instruction queue in the example of FIG. 3A a long time ago, and therefore may have already been checked by the tag processing hardware 140. Thus, a blocklist-based approach may be used to release such transactions quickly.

By contrast, for a non-cached write transaction, it may be more likely that a corresponding instruction has yet to be checked by the tag processing hardware 140. There may be a delay even if a blocklist-based approach is used. Thus, a counter-based approach may be used.

However, it should be appreciated that aspects of the present disclosure are not limited to using any particular approach for a given type of write transactions. In some embodiments, a blocklist approach may be used for both cache write-back transactions and non-cached write transactions, and likewise for a counter-based approach. For instance, in some embodiments, the host processor 110 may have an eviction buffer to hold data being written back while infill data is read from memory first. Accordingly, some delay for cache write-back transactions may be tolerated, and a counter-based approach may be used.

Although details of implementation are described above, it should be appreciated that aspects of the present disclosure are not limited to any particular manner of implementation. For instance, in some embodiments, a tracking number may be used in addition to, or instead of, a pair of counters. For instance, when an instruction executed by the host processor 110, or one or more corresponding transformed instructions, arrive at the tag processing hardware 140, a tracking number may be assigned. The tag processing hardware 140 may report the tracking number to the write interlock 112 as an ingress number. This tracking number may flow through the tag processing hardware 140, along with the instruction (or the one or more corresponding transformed instructions). When the tag processing hardware 140 finishes checking the instruction (or the one or more corresponding transformed instructions), the tag processing hardware 140 may report the tracking number to the write interlock 112 as an egress number.

In some embodiments, in response to detecting an attempt by the host processor 110 to initiate a write transaction, the write interlock 112 may capture a latest ingress number reported by the tag processing hardware 140. The write interlock 112 may stall the write transaction until the tag processing hardware 140 reports an egress number that matches (e.g., is equal to, or greater than) the captured ingress number.

For instance, the write transaction, along with the captured ingress number, may be placed into the result queue 114. In response to receiving a new egress number reported by the tag processing hardware 140, the write interlock 112 may check if the egress number matches (e.g., is equal to, or greater than) an ingress number at the head of the result queue 114. If so, the write interlock 112 may release a corresponding write transaction at the head of the result queue 114.

In some embodiments, the host processor 110 may use a memory interface capable of issuing multiple types of transactions. Such a memory interface may allow transactions of different types to complete in an order that differs from an order in which the transactions are initiated. For instance, the host processor 110 may use an AXI4 interface with different AXI identifiers for transactions to cacheable main memory, non-cacheable main memory, and peripherals (which are non-cacheable), respectively.

The inventors have recognized and appreciated that routing transactions of all types to a single write interlock may create a bottleneck. Therefore, it may be advantageous to treat some or all of these transaction types independently. Accordingly, in some embodiments, the illustrative hardware interface 300 in the example of FIG. 3A may use a suitable memory interface identifier (e.g., an AXI identifier) associated with a transaction to route the transaction into one of multiple write interlocks. Each such write interlock may independently determine when a write transaction may proceed, for instance, using a blocklist, counter, or tracking number mechanism as described above.

As an example, a write interlock responsible for write transactions to non-cacheable memory and/or peripherals may use a counter mechanism to determine when a write transaction may proceed. Additionally, or alternatively, a write interlock responsible for write transactions to cacheable memory may use a blocklist mechanism, or may allow such write transactions to proceed immediately, without waiting for the tag processing hardware 140 to finish checking corresponding instructions. In this manner, there may be no bottleneck at a single write interlock, thereby improving performance.

As described above in connection with the example of FIG. 1, if the illustrative tag processing hardware 140 determines that an instruction represents a policy violation (e.g., based on a miss in the illustrative rule table 144, followed by a response from the illustrative policy processor 150 indicating a policy violation has been found), the tag processing hardware 140 may send a signal (e.g., an interrupt signal, such as a non-maskable interrupt signal) to the illustrative host processor 110. In response to receiving the signal, the host processor 110 may switch to some suitable violation processing code. For example, the host processor 100 may halt, reset, log the violation and continue, perform an integrity check on application code and/or application data, notify an operator, etc.

In some embodiments, in response to detecting a policy violation, the tag processing hardware 140 may generate a data structure to record information regarding the violation. For instance, the data structure may record an instruction address, a data address, instruction metadata, operand metadata, an indication of one or more policy rules that are violated, etc. However, it should be appreciated that aspects of the present disclosure are not limited to recording any particular information regarding a violation, or recording any information at all.

In some embodiments, the data structure generated by the tag processing hardware 140 may be stored in memory for access by the host processor 110. However, the inventors have recognized and appreciated that, in some instances, a statically-configured crossbar may be used to prevent the host processor 110 from accessing memory regions used for metadata processing (e.g., the illustrative metadata memory 125 in the example of FIG. 1). With such a crossbar, it may be challenging to create a small memory region that may be shared between the host processor 110 and the tag processing hardware 140.

Moreover, the inventors have recognized and appreciated that shared memory between the host processor 110 and the tag processing hardware 140 may lead to security vulnerabilities (e.g., by possibly allowing malicious code running on the host processor 110 to attack software running on the tag processing hardware 140).

Accordingly, in some embodiments, enhanced security may be provided by reducing communication capability between the host processor 110 and the tag processing hardware 140. For instance, one or more designated registers may be used for communication between the host processor 110 and the tag processing hardware 140.

As an example, one or more first registers may be used that is writable by the host processor 110 and/or readable by the tag processing hardware 140. When the host processor 110 writes to such a register, a signal (e.g., an interrupt signal) may be triggered to notify the tag processing hardware 140.

Additionally, or alternatively, one or more second registers may be used that is writable by the tag processing hardware 140 and/or readable by the host processor 110. When the tag processing hardware 140 writes to such a register, a signal (e.g., an interrupt signal) may be triggered to notify the host processor 110.

In this manner, what is written by the tag processing hardware 140 may not be overwritten by the host processor 110, and vice versa. Additionally, or alternatively, an attack surface may be reduced for software running on the illustrative policy processor 150 in the example of FIG. 1.

In some embodiments, the tag processing hardware 140 may write to one or more second registers a memory address from which a data structure may be accessed by the host processor 110. For instance, the data structure may store information regarding a policy violation. Additionally, or alternatively, the tag processing hardware 140 may write the data structure itself, or one or more fields thereof, to the one or more second registers.

Figure 5:
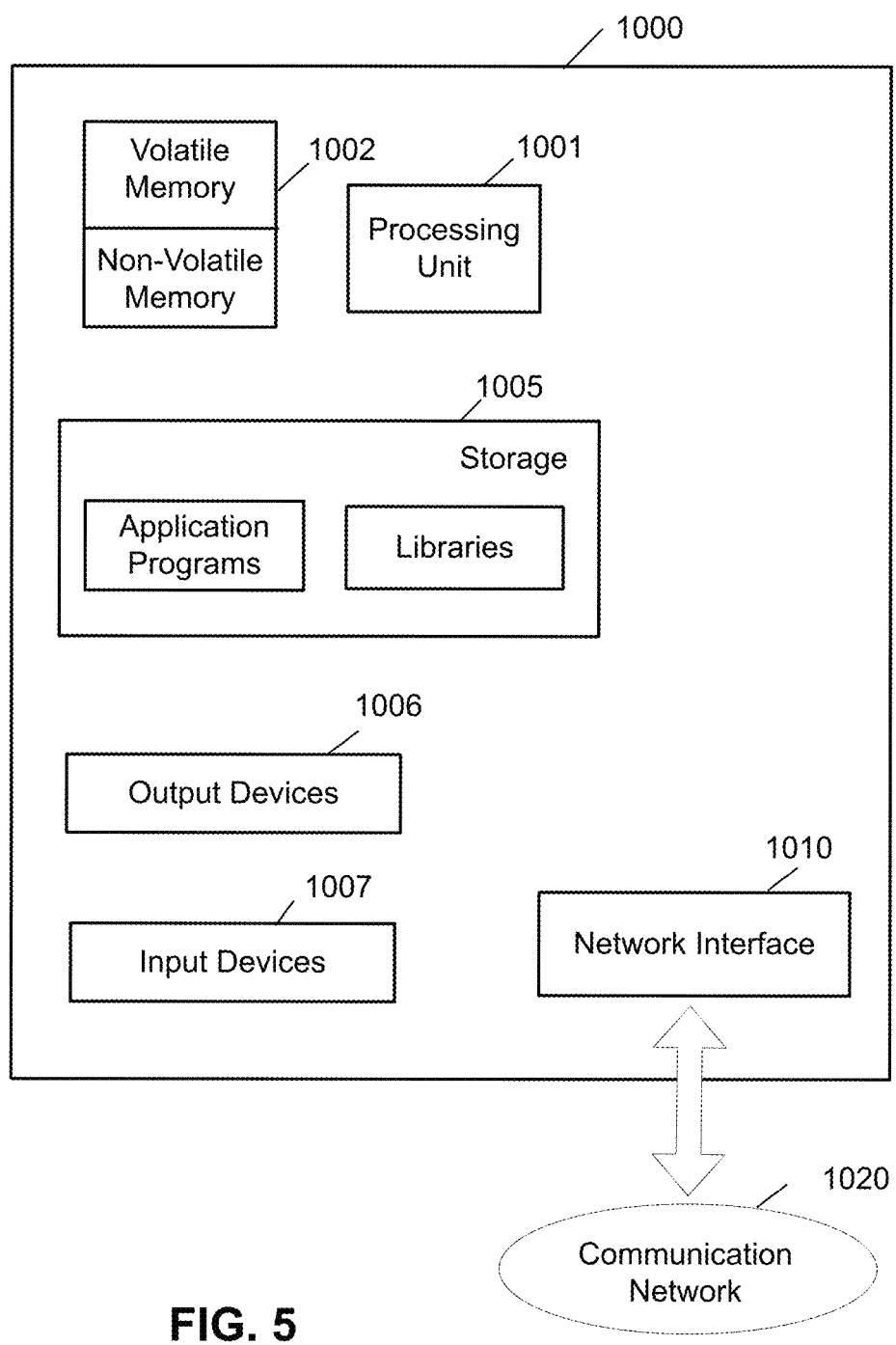
FIG. 5 shows, schematically, an illustrative computer 1000 on which any aspect of the present disclosure may be implemented.

FIG. 5 shows, schematically, an illustrative computer 1000 on which any aspect of the present disclosure may be implemented. In the example shown in FIG. 5, the computer 1000 includes a processing unit 1001 having one or more processors and a computer-readable storage medium 1002 that may include, for example, volatile and/or non-volatile memory. The memory 1002 may store one or more instructions to program the processing unit 1001 to perform any of the functions described herein. The computer 1000 may also include other types of computer-readable medium, such as storage 1005 (e.g., one or more disk drives) in addition to the system memory 1002. The storage 1005 may store one or more application programs and/or resources used by application programs (e.g., software libraries), which may be loaded into the memory 1002.

The computer 1000 may have one or more input devices and/or output devices, such as output devices 1006 and input devices 1007 illustrated in FIG. 5. These devices may be used, for instance, to present a user interface. Examples of output devices that may be used to provide a user interface include printers, display screens, and other devices for visual output, speakers and other devices for audible output, braille displays and other devices for haptic output, etc. Examples of input devices that may be used for a user interface include keyboards, pointing devices (e.g., mice, touch pads, and digitizing tablets), microphones, etc. For instance, the input devices 1007 may include a microphone for capturing audio signals, and the output devices 1006 may include a display screen for visually rendering, and/or a speaker for audibly rendering, recognized text.

In the example of FIG. 5, the computer 1000 may also include one or more network interfaces (e.g., network interface 1010) to enable communication via various networks (e.g., communication network 1020). Examples of networks include local area networks (e.g., an enterprise network), wide area networks (e.g., the Internet), etc. Such networks may be based on any suitable technology, and may operate according to any suitable protocol. For instance, such networks may include wireless networks and/or wired networks (e.g., fiber optic networks).

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing descriptions and drawings are by way of example only.

The above-described embodiments of the present disclosure can be implemented in any of numerous ways. For example, the embodiments may be implemented using hardware, software, or a combination thereof. When implemented in software, the software code may be executed on any suitable processor or collection of processors, whether provided in a single computer, or distributed among multiple computers.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted.

The techniques described herein may be embodied as a non-transitory computer-readable medium (or multiple non-transitory computer-readable media) (e.g., a computer memory, one or more floppy discs, compact discs, optical discs, magnetic tapes, flash memories, circuit configurations in Field Programmable Gate Arrays or other semiconductor devices, or other tangible computer-readable media) encoded with one or more programs that, when executed on one or more processors, perform methods that implement the various embodiments of the present disclosure described above. The computer-readable medium or media may be transportable, such that the program or programs stored thereon may be loaded onto one or more different computers or other processors to implement various aspects of the present disclosure as described above.

The terms "program" or "software" are used herein to refer to any type of computer code or set of computer-executable instructions that may be employed to program one or more processors to implement various aspects of the present disclosure as described above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Program modules may include routines, programs, objects, components, data structures, etc. that perform particular tasks or implement particular abstract data types. Functionalities of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields to locations in a computer-readable medium that convey how the fields are related. However, any suitable mechanism may be used to relate information in fields of a data structure, including through the use of pointers, tags, or other mechanisms that how the data elements are related.

Various features and aspects of the present disclosure may be used alone, in any combination of two or more, or in a variety of arrangements not specifically described in the foregoing, and are therefore not limited to the details and arrangement of components set forth in the foregoing description or illustrated in the drawings. For example, aspects described in one embodiment may be combined in any manner with aspects described in other embodiments.

Also, the techniques described herein may be embodied as methods, of which examples have been provided. The acts performed as part of a method may be ordered in any suitable way. Accordingly, embodiments may be constructed in which acts are performed in an order different from illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," "based on," "according to," "encoding," and variations thereof herein, is meant to encompass the items listed thereafter and equivalents thereof as well as additional items.

What is claimed is:

1. A method for policy violation processing, comprising acts of:
   in response to detecting a policy violation, entering a violation processing mode;
   causing a host processor to begin executing violation processing code;
   continuing checking one or more instructions in an instruction queue;
   in response to encountering, in the instruction queue, an instruction of the violation processing code, exiting the violation processing mode;
   maintaining a set of one or more memory addresses accessed by one or more disallowed instructions; and
   in response to receiving, from the host processor, a write transaction:
      determining if a target address of the write transaction is among the set of one or more memory addresses accessed by one or more disallowed instructions; and
      in response to determining that the target address is among the set of one or more memory addresses accessed by one or more disallowed instructions, sequestering data to be written by the write transaction.

2. The method of claim 1, further comprising acts of:
   upon entering the violation processing mode, stalling the host processor's execution of the violation processing code; and
   upon exiting the violation processing mode, allowing the violation processing code to proceed.

3. The method of claim 1, further comprising an act of:
   recording a memory address accessed by an instruction associated with the policy violation.

4. The method of claim 1, further comprising an act of:
   terminating one or more threads associated with the write transaction.

5. The method of claim 1, wherein:
   the target address comprises a first target address; and
   sequestering data to be written by the write transaction comprises:
      allocating, based on a size of the data to be written, a memory segment at a second target address different from the first target address; and
      causing the write transaction to be performed using the second target address.

6. The method of claim 5, wherein:
   sequestering data to be written by the write transaction further comprises:
      creating a data structure in a selected memory region for sequestration, the data structure comprising the memory segment at the second target address; and
   the method further comprises an act of:
      writing into the data structure at least one item selected from a group consisting of:
   the first target address, the size of the data to be written, a length of transaction burst, a burst type, a transaction beat size, a bus interface write identifier, a memory region identifier, a quality of service setting.

7. The method of claim 5, wherein:
   the write transaction comprises a first write transaction; and
   the method further comprises an act of:
      causing a second write transaction to be performed using the first target address and the data to be written.

8. The method of claim 6, wherein:
   causing the write transaction to be performed using the second target address comprises:
      identifying, from a plurality of write interlocks, a write interlock where the write transaction is pending; and
      instructing the write interlock to perform the write transaction with the second target address.

9. The method of claim 8, wherein:
   identifying a write interlock where the write transaction is pending comprises querying a quarantine block configured to receive, from the plurality of write interlocks, requests regarding write transactions; and
   the quarantine block is further configured to determine if the target address of the write transaction is among the set of one or more memory addresses accessed by one or more disallowed instructions.

10. The method of claim 1, wherein:
determining if a target address of the write transaction is among the set of one or more memory addresses accessed by one or more disallowed instructions comprises querying a quarantine block configured to receive, from a write interlock, requests regarding write transactions; and
the quarantine block is further configured to:
  maintain a first counter that counts a number of instructions that the host processor has executed;
  maintain a second counter that counts a number of instructions that has been checked;
  in response to receiving a request from the write interlock regarding the write transaction, capture a value of the first counter; and
  respond to the request when the second counter has reached the captured value.

11. The method of claim 10, wherein:
the write interlock is configured to keep the write transaction pending until a corresponding response has been received from the quarantine block.

12. The method of claim 10, wherein:
the quarantine block is configured to determine that the second counter has reached the captured value at least in part by:
  determining that a current value of the second counter is great than or equal to the captured value; and
  determining that the current value of the second counter exceeds the captured value by an amount that is less than or equal to a tag processing hardware capacity.

13. The method of claim 10, wherein:
a first instruction executed by the host processor is transformed into a plurality of second instructions to be checked; and
the quarantine block is configured to maintain the second counter at least in part by:
  incrementing the second counter by one, after all of the plurality of second instructions have been checked.

14. The method of claim 10, wherein:
a first instruction executed by the host processor is not checked; and
the quarantine block is configured to maintain the second counter at least in part by:
  incrementing the second counter by one upon receiving the first instruction.

15. A computer system comprising circuitry and/or one or more processors programmed by executable instructions, wherein the circuitry and/or the one or more programmed processors are configured to perform a method for policy violation processing, the method comprising acts of:
  in response to detecting a policy violation, entering a violation processing mode;
  causing a host processor to begin executing violation processing code;
  continuing checking one or more instructions in an instruction queue;
  in response to encountering, in the instruction queue, an instruction of the violation processing code, exiting the violation processing mode;
  maintaining a set of one or more memory addresses accessed by one or more disallowed instructions; and
  in response to receiving, from the host process, a write transaction:
    determining if a target address of the write transaction is among the set of one or more memory addresses accessed by one or more disallowed instructions; and
    in response to determining that the target address is among the set of one or more memory addresses accessed by one or more disallowed instructions, sequestering data to be written by the write transaction.

16. The system of claim 15, wherein the method further comprises acts of:
  upon entering the violation processing mode, stalling the host processor's execution of the violation processing code; and
  upon exiting the violation processing mode, allowing the violation processing code to proceed.

17. The system of claim 15, wherein the method further comprises an act of:
  recording a memory address accessed by an instruction associated with the policy violation.

18. The system of claim 15, wherein the method further comprises an act of:
  terminating one or more threads associated with the write transaction.

19. The system of claim 15, wherein:
the target address comprises a first target address; and
sequestering data to be written by the write transaction comprises:
  allocating, based on a size of the data to be written, a memory segment at a second target address different from the first target address; and
  causing the write transaction to be performed using the second target address.

20. The system of claim 19, wherein:
sequestering data to be written by the write transaction further comprises:
  creating a data structure in a selected memory region for sequestration, the data structure comprising the memory segment at the second target address; and
the method further comprises an act of:
  writing into the data structure at least one item selected from a group consisting of:
  the first target address, the size of the data to be written, a length of transaction burst, a burst type, a transaction beat size, a bus interface write identifier, a memory region identifier, and a quality of service setting.

21. The system of claim 19, wherein:
the write transaction comprises a first write transaction; and
the method further comprises an act of:
  causing a second write transaction to be performed using the first target address and the data to be written.

22. The system of claim 19, wherein:
causing the write transaction to be performed using the second target address comprises:
  identifying, from a plurality of write interlocks, a write interlock where the write transaction is pending; and
  instructing the write interlock to perform the write transaction with the second target address.

23. The system of claim 22, wherein:
identifying a write interlock where the write transaction is pending comprises querying a quarantine block configured to receive, from the plurality of write interlocks, requests regarding write transactions; and
the quarantine block is further configured to determine if the target address of the write transaction is among the set of one or more memory addresses accessed by one or more disallowed instructions.

24. The system of claim 15, wherein:
determining if a target address of the write transaction is among the set of one or more memory addresses accessed by one or more disallowed instructions comprises querying a quarantine block configured to receive, from a write interlock, requests regarding write transactions; and
the quarantine block is further configured to:
  maintain a first counter that counts a number of instructions that the host processor has executed;
  maintain a second counter that counts a number of instructions that has been checked;
  in response to receiving a request from the write interlock regarding the write transaction, capture a value of the first counter; and
  respond to the request when the second counter has reached the captured value.

25. The system of claim 24, wherein:
the write interlock is configured to keep the write transaction pending until a corresponding response has been received from the quarantine block.

26. The system of claim 24, wherein:
the quarantine block is configured to determine that the second counter has reached the captured value at least in part by:
  determining that a current value of the second counter is great than or equal to the captured value; and
  determining that the current value of the second counter exceeds the captured value by an amount that is less than or equal to a tag processing hardware capacity.

27. The system of claim 24, wherein:
a first instruction executed by the host processor is transformed into a plurality of second instructions to be checked; and
the quarantine block is configured to maintain the second counter at least in part by:
  incrementing the second counter by one, after all of the plurality of second instructions have been checked.

28. The system of claim 24, wherein:
a first instruction executed by the host processor is not checked; and
the quarantine block is configured to maintain the second counter at least in part by:
  incrementing the second counter by one upon receiving the first instruction.

29. At least one non-transitory computer-readable medium having stored thereon: at least one hardware description for circuitry; and/or
  executable instructions, wherein the circuitry and/or one or more processors, when programmed by the executable instructions, are configured to perform a method for policy violation processing, the method comprising acts of:
  in response to detecting a policy violation, entering a violation processing mode; causing a host processor to begin executing violation processing code;
  continuing checking one or more instructions in an instruction queue;
  in response to encountering, in the instruction queue, an instruction of the violation processing code, exiting the violation processing mode;
  maintaining a set of one or more memory addresses accessed by one or more disallowed instructions; and
  in response to receiving, from the host process, a write transaction:
  determining if a target address of the write transaction is among the set of one or more memory addresses accessed by one or more disallowed instructions; and
  in response to determining that the target address is among the set of one or more memory addresses accessed by one or more disallowed instructions, sequestering data to be written by the write transaction.

* * * * *